United States Patent
Pursifull et al.

(10) Patent No.: US 11,118,552 B2
(45) Date of Patent: Sep. 14, 2021

(54) METHOD AND SYSTEM FOR ENGINE CONTROL

(71) Applicant: Ford Global Technologies, LLC, Dearborn, MI (US)

(72) Inventors: Ross Pursifull, Dearborn, MI (US); Ralph Wayne Cunningham, Milan, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 61 days.

(21) Appl. No.: 16/361,131

(22) Filed: Mar. 21, 2019

(65) Prior Publication Data
US 2020/0300205 A1    Sep. 24, 2020

(51) Int. Cl.
| F02N 11/08 | (2006.01) |
| F01L 13/08 | (2006.01) |
| F02D 13/02 | (2006.01) |
| B60W 20/40 | (2016.01) |

(52) U.S. Cl.
CPC .......... *F02N 11/084* (2013.01); *B60W 20/40* (2013.01); *F01L 13/08* (2013.01); *F02D 13/0246* (2013.01); *F02D 13/0261* (2013.01); *F02N 11/0822* (2013.01); *B60W 2710/30* (2013.01); *B60W 2710/305* (2013.01); *F01N 2410/00* (2013.01); *F01N 2410/06* (2013.01); *F02N 2200/061* (2013.01); *F02N 2200/0802* (2013.01); *F02N 2200/0806* (2013.01); *F02N 2300/102* (2013.01)

(58) Field of Classification Search
None
See application file for complete search history.

(56) References Cited

U.S. PATENT DOCUMENTS

| 4,393,964 A * | 7/1983 | Kemper | F16H 15/50 |
| | | | 477/6 |
| 5,803,040 A | 9/1998 | Biesinger et al. | |
| 5,947,863 A | 9/1999 | Grob et al. | |
| 7,610,143 B1 | 10/2009 | Boesch | |
| 7,657,351 B2 * | 2/2010 | Moran | B60W 10/04 |
| | | | 701/22 |
| 7,680,568 B2 * | 3/2010 | Moran | B60W 10/26 |
| | | | 701/22 |
| 7,689,331 B2 * | 3/2010 | Moran | B60L 7/14 |
| | | | 701/22 |
| 8,326,519 B2 | 12/2012 | McDonald et al. | |
| 8,467,926 B2 * | 6/2013 | Perkins | F02D 13/0261 |
| | | | 701/22 |

(Continued)

FOREIGN PATENT DOCUMENTS

EP    2634397    9/2013

*Primary Examiner* — Kevin R Steckbauer
(74) *Attorney, Agent, or Firm* — Geoffrey Brumbaugh; McCoy Russell LLP

(57) ABSTRACT

Methods and systems are provided for extending a duration of engine idle-stop while reducing a frequency of engine restart from idle-stop. In one example, in response to engine restart conditions where combustion torque is not necessary, an engine can be rotated electrically, without fuel delivery, via an electric motor. The unfueled engine spinning via the motor drives an FEAD which in turns drives an actuator coupled to the FEAD, such as an AC compressor or an automatic transmission oil pump.

17 Claims, 7 Drawing Sheets

(56) References Cited

U.S. PATENT DOCUMENTS

| | | | |
|---|---|---|---|
| 8,467,927 B2* | 6/2013 | Thompson | B60K 6/445 |
| | | | 701/22 |
| 8,718,857 B2* | 5/2014 | Perkins | F02D 13/0261 |
| | | | 701/22 |
| 9,327,706 B2* | 5/2016 | Reed | B60K 6/48 |
| 9,346,451 B2* | 5/2016 | Ulrey | B60W 10/06 |
| 9,352,738 B2* | 5/2016 | Kellerman | B60W 10/10 |
| 9,650,974 B2* | 5/2017 | Dudar | F02D 41/003 |
| 9,714,027 B2* | 7/2017 | Yamazaki | B60W 10/08 |
| 9,759,135 B2* | 9/2017 | Ulrey | B60W 30/192 |
| 9,850,832 B2* | 12/2017 | Dudar | F01N 3/103 |
| 9,856,829 B2* | 1/2018 | Leone | B60W 20/00 |
| 9,856,830 B2* | 1/2018 | Dudar | F02M 26/13 |
| 9,925,974 B2* | 3/2018 | Leone | B60W 20/13 |
| 10,012,159 B1* | 7/2018 | Ulrey | F02D 41/1448 |
| 10,012,183 B2* | 7/2018 | Dudar | F02M 25/089 |
| 10,018,123 B1* | 7/2018 | Ulrey | F02D 41/26 |
| 10,024,255 B2* | 7/2018 | Ulrey | F02M 26/14 |
| 10,060,371 B2* | 8/2018 | Ulrey | F02N 19/004 |
| 10,093,306 B2* | 10/2018 | Kim | B60W 10/06 |
| 10,094,310 B2* | 10/2018 | Ulrey | F02D 13/0249 |
| 10,100,770 B2* | 10/2018 | Dudar | F02D 35/02 |
| 10,107,220 B2* | 10/2018 | Ulrey | F02M 26/20 |
| 10,132,235 B2* | 11/2018 | Ulrey | F02B 37/025 |
| 10,138,822 B2* | 11/2018 | Ulrey | F02D 41/0072 |
| 10,145,315 B2* | 12/2018 | Ulrey | F02M 26/41 |
| 10,161,324 B2* | 12/2018 | Ulrey | F01N 3/103 |
| 10,161,332 B2* | 12/2018 | Ulrey | F02B 37/00 |
| 10,161,334 B2* | 12/2018 | Ulrey | F02B 37/00 |
| 10,190,507 B2* | 1/2019 | Ulrey | F02M 26/14 |
| 10,316,771 B2* | 6/2019 | Ulrey | F02M 26/05 |
| 10,328,924 B2* | 6/2019 | Ulrey | F02M 35/10209 |
| 10,330,001 B2* | 6/2019 | Leone | F02M 26/20 |
| 10,337,425 B2* | 7/2019 | Boyer | F01N 3/103 |
| 10,364,763 B2* | 7/2019 | Dudar | F02M 25/0809 |
| 10,371,102 B2* | 8/2019 | Dudar | F02D 41/0042 |
| 10,393,039 B2* | 8/2019 | Ulrey | F02M 35/10268 |
| 10,393,041 B2* | 8/2019 | Ulrey | F02M 26/22 |
| 10,464,408 B2* | 11/2019 | Dudar | B60W 20/50 |
| 10,472,999 B2* | 11/2019 | Pedro | B60W 10/06 |
| 10,479,343 B2* | 11/2019 | Frait | B60W 10/08 |
| 10,487,789 B2* | 11/2019 | Money | F02N 9/04 |
| 10,543,832 B2* | 1/2020 | Yamazaki | B60W 10/115 |
| 10,550,773 B2* | 2/2020 | Ulrey | F02D 41/123 |
| 10,557,421 B2* | 2/2020 | Ulrey | F02D 41/123 |
| 10,557,425 B2* | 2/2020 | Ulrey | F02D 41/1448 |
| 10,562,512 B2* | 2/2020 | Miller | B60W 20/15 |
| 10,563,605 B2* | 2/2020 | Dudar | F02B 37/18 |
| 10,590,875 B2* | 3/2020 | Ulrey | F02B 37/183 |
| 10,598,071 B2* | 3/2020 | Dudar | F02D 41/042 |
| 10,604,137 B2* | 3/2020 | Doering | B60W 30/18054 |
| 10,632,996 B2* | 4/2020 | Lechlitner | B60W 20/14 |
| 10,677,172 B2* | 6/2020 | Ulrey | B60W 20/40 |
| 10,683,817 B2* | 6/2020 | Ulrey | F02D 41/0077 |
| 10,731,573 B2* | 8/2020 | Ulrey | F01N 13/107 |
| 10,737,679 B2* | 8/2020 | Frait | B60W 10/08 |
| 10,753,299 B2* | 8/2020 | Ulrey | F02D 13/0257 |
| 10,760,517 B2* | 9/2020 | Dudar | F02B 39/10 |
| 10,774,725 B2* | 9/2020 | Dudar | B60W 10/06 |
| 10,882,511 B2* | 1/2021 | Ulrey | F01N 13/107 |
| 2004/0214687 A1 | 10/2004 | Morisawa et al. | |
| 2007/0032340 A1 | 2/2007 | Hrovat et al. | |
| 2007/0124037 A1* | 5/2007 | Moran | B60W 20/00 |
| | | | 701/22 |
| 2008/0147260 A1* | 6/2008 | Moran | B60L 58/12 |
| | | | 701/22 |
| 2008/0177434 A1* | 7/2008 | Moran | B60W 10/26 |
| | | | 701/22 |
| 2010/0145562 A1* | 6/2010 | Moran | F02N 11/0837 |
| | | | 701/22 |
| 2013/0116866 A1* | 5/2013 | Perkins | B60K 6/445 |
| | | | 701/22 |
| 2013/0116867 A1* | 5/2013 | Thompson | B60W 30/1846 |
| | | | 701/22 |
| 2013/0281257 A1* | 10/2013 | Perkins | B60W 10/08 |
| | | | 477/3 |
| 2014/0171260 A1* | 6/2014 | Dalum | B60K 6/48 |
| | | | 477/5 |
| 2015/0038293 A1* | 2/2015 | Kellerman | B60W 10/10 |
| | | | 477/77 |
| 2015/0136093 A1* | 5/2015 | Moore | F02B 33/44 |
| | | | 123/568.12 |
| 2015/0217751 A1* | 8/2015 | Reed | B60W 10/02 |
| | | | 701/67 |
| 2015/0283990 A1* | 10/2015 | Ulrey | B60K 6/445 |
| | | | 477/3 |
| 2015/0285161 A1* | 10/2015 | Ulrey | B60W 20/16 |
| | | | 477/3 |
| 2016/0046282 A1* | 2/2016 | Yamazaki | B60W 10/06 |
| | | | 477/5 |
| 2016/0215711 A1* | 7/2016 | Dudar | B60W 20/00 |
| 2016/0319718 A1* | 11/2016 | Dudar | F01N 3/00 |
| 2017/0002761 A1* | 1/2017 | Dudar | F02D 35/02 |
| 2017/0028837 A1* | 2/2017 | Welschoff | B60L 58/12 |
| 2017/0030271 A1* | 2/2017 | Dudar | B60W 30/18054 |
| 2017/0082043 A1* | 3/2017 | Dudar | F01N 3/103 |
| 2017/0151941 A1* | 6/2017 | Kim | F02N 19/00 |
| 2017/0198671 A1* | 7/2017 | Dudar | F02M 35/10019 |
| 2017/0217753 A1* | 8/2017 | Dudar | F02M 25/0809 |
| 2017/0218885 A1* | 8/2017 | Dudar | F02D 41/0042 |
| 2017/0305411 A1* | 10/2017 | Leone | F02D 41/0087 |
| 2017/0305413 A1* | 10/2017 | Yamazaki | B60W 10/115 |
| 2017/0306858 A1* | 10/2017 | Ulrey | B60W 20/40 |
| 2017/0306893 A1* | 10/2017 | Leone | B60K 6/445 |
| 2017/0320496 A1* | 11/2017 | Landerl | B60W 30/192 |
| 2018/0051598 A1* | 2/2018 | Pedro | B60W 10/06 |
| 2018/0118184 A1* | 5/2018 | Ruybal | B60W 10/08 |
| 2018/0118185 A1* | 5/2018 | Frait | B60W 20/00 |
| 2018/0118190 A1* | 5/2018 | Ruybal | F16H 61/688 |
| 2018/0118196 A1* | 5/2018 | Doering | F16H 61/47 |
| 2018/0119801 A1* | 5/2018 | Frait | B60W 10/06 |
| 2018/0119808 A1* | 5/2018 | Miller | B60W 10/188 |
| 2018/0170353 A1* | 6/2018 | Ulrey | F01N 13/00 |
| 2018/0171867 A1* | 6/2018 | Ulrey | F01N 3/10 |
| 2018/0171868 A1* | 6/2018 | Leone | F02D 41/005 |
| 2018/0171883 A1* | 6/2018 | Ulrey | F02M 26/20 |
| 2018/0171884 A1* | 6/2018 | Ulrey | F02D 41/062 |
| 2018/0171886 A1* | 6/2018 | Ulrey | F02M 26/23 |
| 2018/0171887 A1* | 6/2018 | Ulrey | F01N 13/107 |
| 2018/0171897 A1* | 6/2018 | Boyer | F01N 13/107 |
| 2018/0171898 A1* | 6/2018 | Ulrey | F02B 25/145 |
| 2018/0171899 A1* | 6/2018 | Ulrey | F02B 37/183 |
| 2018/0171904 A1* | 6/2018 | Ulrey | F01N 3/10 |
| 2018/0171905 A1* | 6/2018 | Ulrey | F02D 13/0257 |
| 2018/0171906 A1* | 6/2018 | Ulrey | F02M 26/04 |
| 2018/0171907 A1* | 6/2018 | Ulrey | F02M 35/10222 |
| 2018/0171908 A1* | 6/2018 | Ulrey | F02D 41/26 |
| 2018/0171911 A1* | 6/2018 | Ulrey | F02M 35/104 |
| 2018/0171913 A1* | 6/2018 | Ulrey | F02D 41/1454 |
| 2018/0171914 A1* | 6/2018 | Ulrey | F02N 19/004 |
| 2018/0171917 A1* | 6/2018 | Ulrey | F02N 19/004 |
| 2018/0320612 A1* | 11/2018 | Ulrey | F01N 13/107 |
| 2018/0320613 A1* | 11/2018 | Ulrey | F02D 41/0007 |
| 2018/0326988 A1* | 11/2018 | Lechlitner | B60K 6/442 |
| 2018/0340482 A1* | 11/2018 | Ulrey | F02D 13/0257 |
| 2018/0354353 A1* | 12/2018 | Dudar | G07C 5/0825 |
| 2018/0363577 A1* | 12/2018 | Ulrey | F02D 13/0249 |
| 2019/0003412 A1* | 1/2019 | Ulrey | F01N 13/107 |
| 2019/0017427 A1* | 1/2019 | Dudar | F02D 13/0215 |
| 2019/0032579 A1* | 1/2019 | Ulrey | F02M 26/15 |
| 2019/0055891 A1* | 2/2019 | Ulrey | F02D 13/0261 |
| 2019/0093579 A1* | 3/2019 | Ulrey | F02D 13/0261 |
| 2019/0120146 A1* | 4/2019 | Ulrey | F02D 41/064 |
| 2019/0203630 A1* | 7/2019 | Dudar | F02M 26/47 |
| 2019/0211768 A1* | 7/2019 | Dudar | F02D 41/18 |
| 2019/0234327 A1* | 8/2019 | Ulrey | F02D 41/005 |
| 2019/0263384 A1* | 8/2019 | Ulrey | B60W 10/08 |
| 2019/0277211 A1* | 9/2019 | Dudar | F02M 25/0809 |
| 2019/0285017 A1* | 9/2019 | Dudar | F02D 37/18 |
| 2020/0079353 A1* | 3/2020 | Yamazaki | B60W 10/06 |

(56) References Cited

U.S. PATENT DOCUMENTS

2020/0122709 A1* 4/2020 Cunningham ........... B60K 6/40
2020/0208581 A1* 7/2020 Ulrey .................. F02D 41/0077
2020/0386127 A1* 12/2020 Hakeem .............. F02D 13/0261

* cited by examiner

METHOD AND SYSTEM FOR ENGINE CONTROL

FIELD

The present description relates generally to methods and systems for controlling vehicle operation to reduce engine restarts for reasons that do not require engine combustion torque.

BACKGROUND/SUMMARY

Vehicles have been developed to perform an idle-stop when idle-stop conditions are met and automatically restart the engine when restart conditions are met. Such idle-stop systems enable fuel savings, reduction in exhaust emissions, reduction in noise, and the like.

One example of a vehicle having an engine configured with idle-stop capabilities is shown by Boesch in U.S. Pat. No. 7,610,143. Therein, a controller may initiate an engine idle-stop, wherein cylinder fueling is disabled and the engine is spun down to rest, if all of the idle-stop conditions are met. Example engine idle-stop conditions include the engine idling for a longer than a threshold duration, such as while the vehicle is at a traffic stop, the battery being sufficiently charged, a request for air conditioning to cool a vehicle cabin not being made, the engine being sufficiently warm, and the vehicle speed being below a threshold, such as when the vehicle is at rest.

In comparison, the engine may be restaffed if any of the restart conditions are met. As such, there may be a myriad reasons that trigger an engine restart. For example, the engine may be restarted to charge a drained battery, drive a transmission pump (to raise transmission hydraulic pressure), or to deliver engine torque responsive to an increase in engine torque demand, such as may occur when an operator releases a brake pedal and/or applies an accelerator pedal. An engine may alternatively be restarted to drive a compressor of an air conditioning (AC) system when an operator requests cabin cooling.

However the inventors herein have recognized potential issues with such systems. As one example, at least some of the engine restart conditions may not require engine combustion torque. In those conditions, resuming engine fueling and cylinder combustion may reduce the fuel economy benefit of the earlier idle-stop operation. If the engine is spun without any fuel being combusted, such as via a BISG motor-generator, fresh air may be pumped through the cylinders and across an exhaust catalyst, causing catalyst cooling and increasing catalyst oxygen loading. As a result, when the engine is fueled, additional fuel may have been delivered to regenerate the catalyst, reducing the fuel economy benefit of the earlier idle-stop.

In one example, the issues described above may be addressed by a method comprising: responsive to selected engine restart conditions, spinning an engine, unfueled, via a motor at a speed that drives an actuator coupled to a front end accessory drive (FEAD) coupled to the engine. Further, while spinning the engine unfueled, a controller may disable blowdown of air from an engine manifold to an exhaust catalyst. In this way, by spinning the engine via the motor at higher than a cranking speed without resuming fuel delivery, while holding an exhaust valve that causes the air pumped through the engine to not be diverted to an exhaust catalyst, a duration of engine idle-stop can be extended to improve fuel economy.

As another example, an engine of a hybrid electric vehicle may be shutdown responsive to idle-stop conditions being met. The engine may be a scavenged-cooled EGR engine having a split exhaust manifold wherein a first exhaust valve of each cylinder is coupled to a first exhaust manifold and a second exhaust valve is coupled to a second, different exhaust manifold. The first exhaust manifold may be coupled to an intake manifold via an EGR passage while the second exhaust manifold may be coupled to an exhaust passage upstream of a turbine, one or more exhaust catalysts coupled in the exhaust passage downstream of the turbine. If an engine restart is requested to charge a system battery, the engine may be spun, fueled, so as to generate engine combustion torque for charging the battery. However, if the engine restart is requested to drive an AC compressor, to provide cabin cooling, then the engine may be spun, unfueled, via an electric motor of the vehicle. The electric motor may be a start motor/generator or an electric drive motor/generator. The motor may spin the engine at a speed that is higher than the cranking speed, so as to provide power to the AC compressor via a front end accessory drive (FEAD). If the engine restart was required to drive an alternate actuator coupled to the FEAD, such as a transmission oil pump, then the engine may be spun unfueled to support the operation of the alternate actuator. By adjusting the engine speed, and thereby the FEAD torque output, one or more actuators coupled to the FEAD may be operated. Concurrently, to reduce catalyst cooling and oxygen loading, a timing (and lift) of the first and second exhaust valves may be varied to vary the direction of exhaust flow in the scavenge-cooled EGR engine. Specifically, the second exhaust valves may be held closed, or their opening may be delayed relative to the opening of the first exhaust valves, so as to reduce the flow of air being pumped through the cylinders and into the exhaust passage. The first exhaust valves may be held open, or their opening may be advanced, so as to increase recirculation of the pumped air through the cylinders.

In this way, a frequency of engine fueled restarts is decreased, improving fuel economy benefits of an idle-stop engine. The technical effect of spinning an engine, unfueled, via an electric motor is that the spinning engine can drive an FEAD to power an actuator coupled to the FEAD. By relying on FEAD torque generated via an electric motor, the actuator can be operated without needing to combust fuel in the engine. As a result, fueled engine restarts can be limited to conditions that necessarily rely on engine combustion torque.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
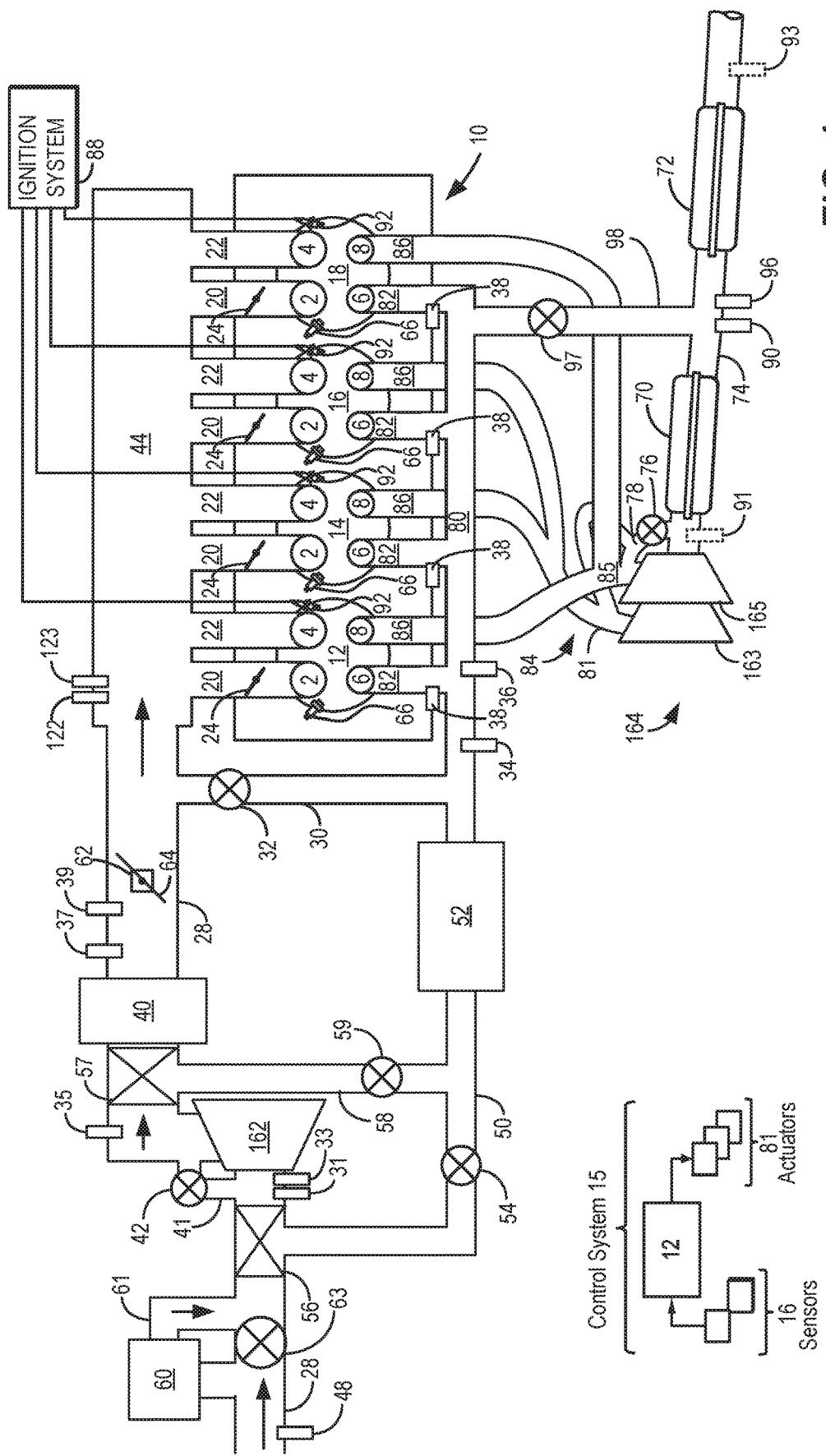
FIG. 1 shows a schematic depiction of a turbocharged engine system with a split exhaust system.
Figure 2:
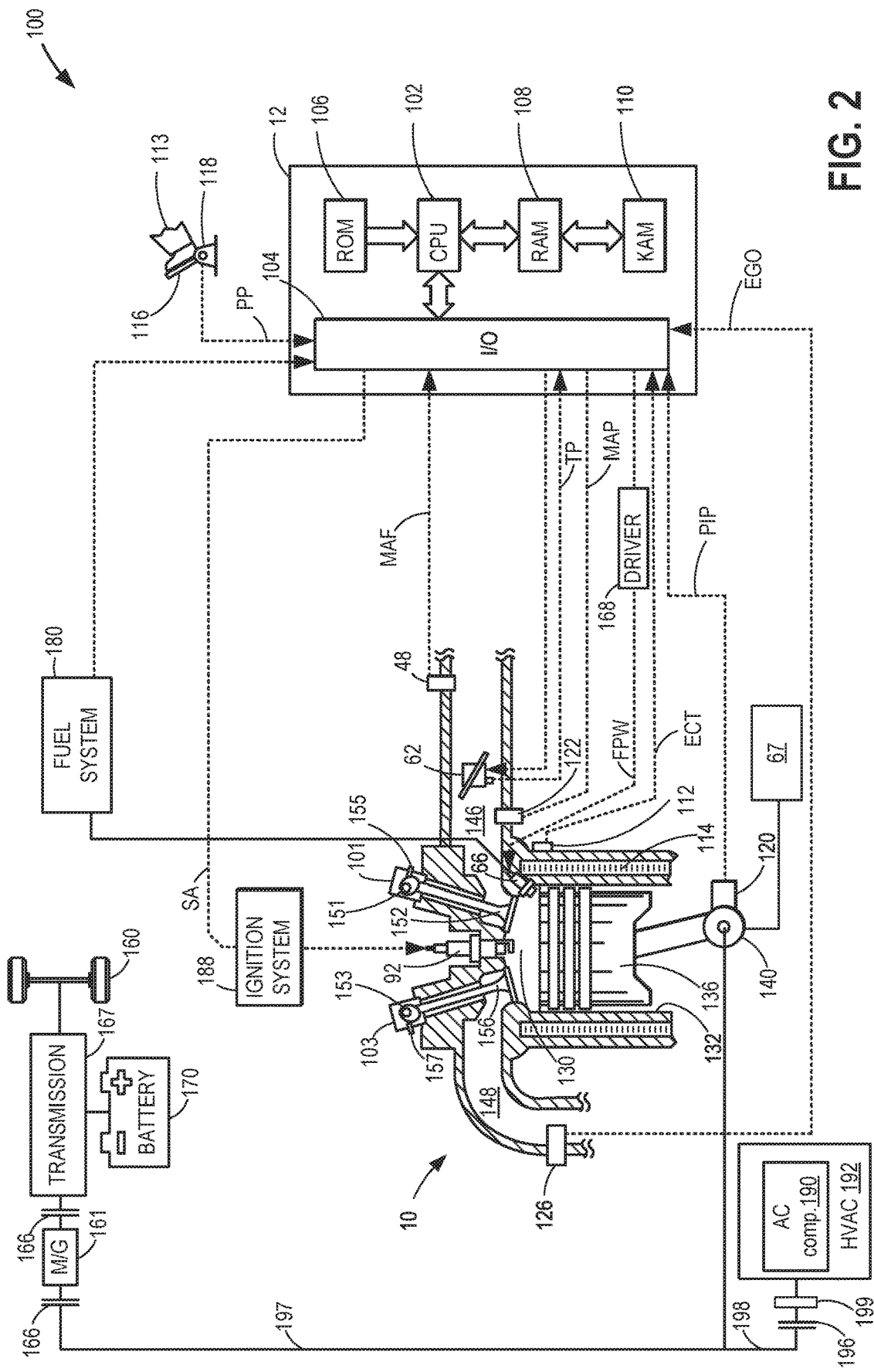
FIG. 2 shows an embodiment of a cylinder of the engine system of FIG. 1.
Figure 4A:
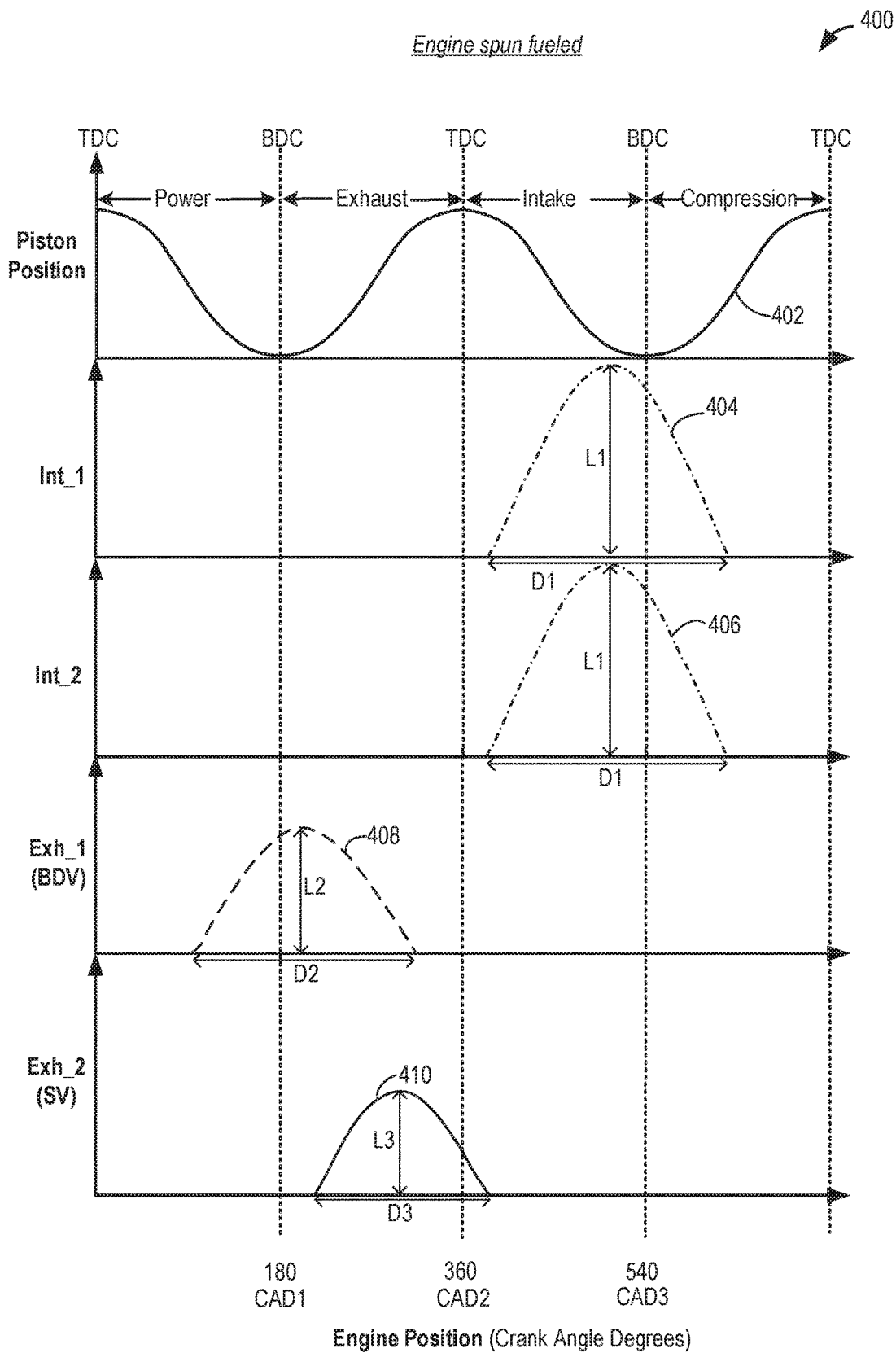
FIG. 4A shows example cylinder intake valve and exhaust valve timings applied during to an engine having a split exhaust engine system during an engine restart where the engine is spun fueled.
Figure 4B:
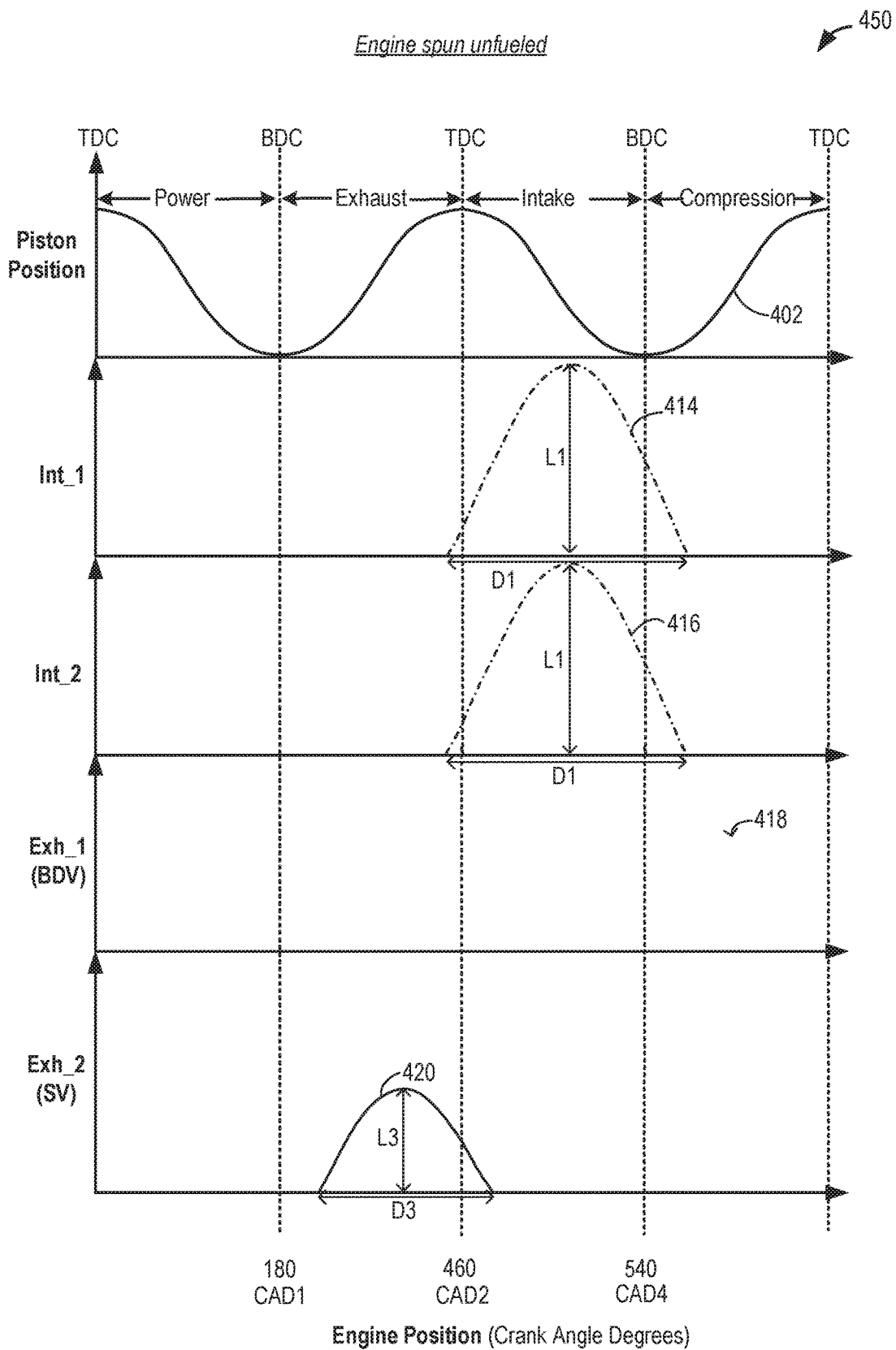
FIG. 4B shows example cylinder intake valve and exhaust valve timings applied during to an engine having a split exhaust engine system during an engine restart where the engine is spun unfueled.
Figure 5:
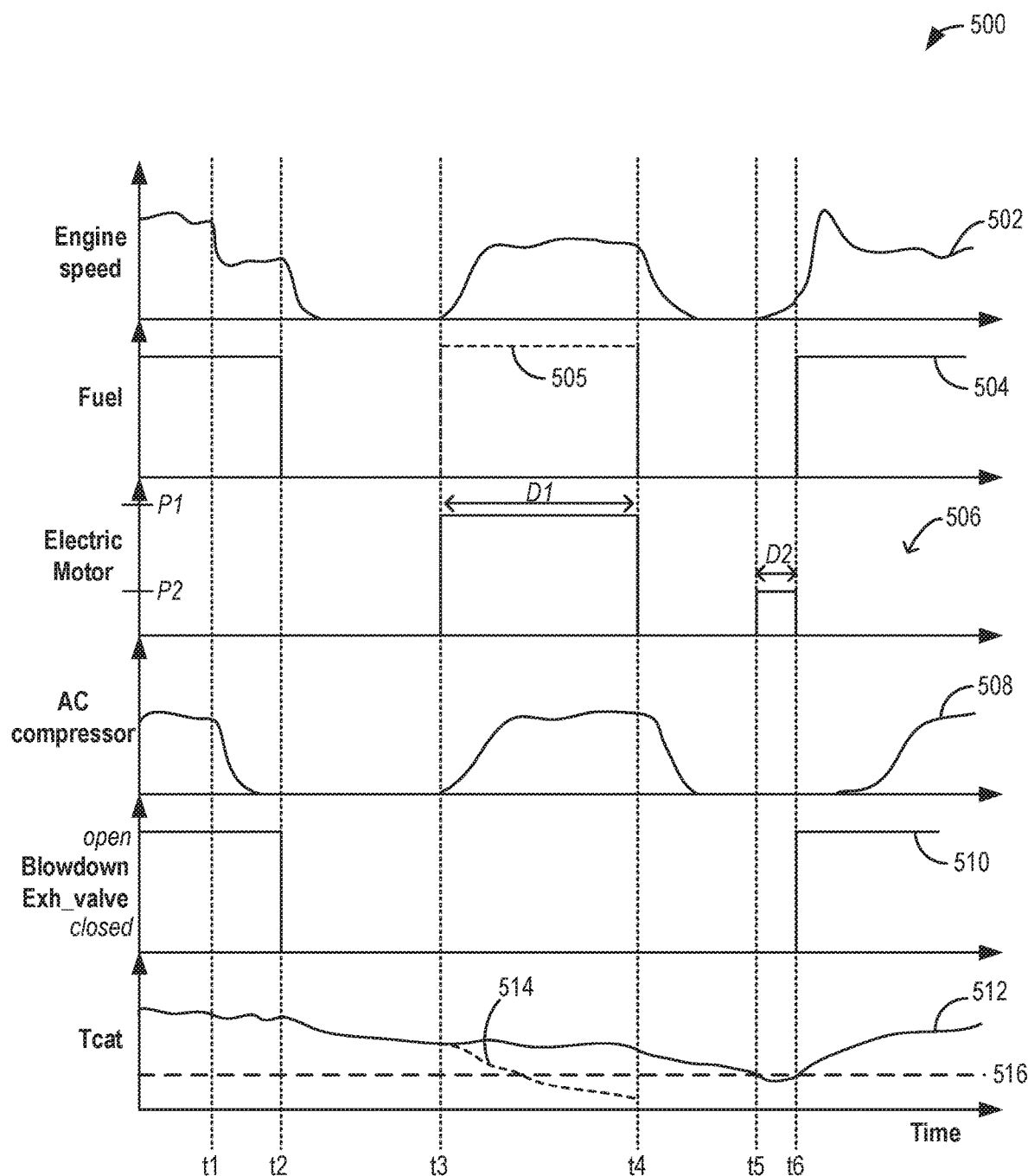
FIG. 5 shows a prophetic example of an engine restart from idle stop, in accordance with the present disclosure.

Methods and systems are provided for extending a duration of idle-stop in an engine having a split exhaust system, such as the engine system of FIGS. 1-2. A controller may be configured to perform a control routine, such as the example routine of FIG. 3, to restart the engine from idle-stop by spinning the engine unfueled via a motor during selected restart conditions. During other restart conditions, the engine is restarted by resuming cylinder combustion. The conditions may be selected based on a variety of parameters, as listed at FIG. 6. To reduce exhaust catalyst cooling and oxygen loading, the timing of individual cylinder exhaust valves coupled to distinct exhaust manifolds is adjusted so as to recirculate a larger portion of the air pumped through the cylinders, as shown at FIGS. 4A-4B. An example restart operation is shown at FIG. 5.

In the following description, a valve being operational or activated indicates that it is opened and/or closed according to determined timings during the combustion cycle for a given set of conditions. Likewise, a valve being deactivated or inoperative indicates that the valve is maintained closed, unless otherwise stated.

FIG. 1 shows a schematic diagram of a multi-cylinder internal combustion engine 10, which may be included in a propulsion system of an automobile. Engine 10 includes a plurality of combustion chambers (i.e., cylinders) which may be capped on the top by a cylinder head (not shown). In the example shown in FIG. 1, engine 10 includes cylinders 12, 14, 16, and 18, arranged in an inline-4 configuration. It should be understood, however, that though FIG. 1 shows four cylinders, engine 10 may include any number of cylinders in any configuration, e.g., V-6, I-6, V-12, opposed 4, etc. Further, the cylinders shown in FIG. 1 may have a cylinder configuration, such as the cylinder configuration shown in FIG. 2, as described further below. Each of cylinders 12, 14, 16, and 18 include two intake valves, including first intake valve 2 and second intake valve 4, and two exhaust valves, including first exhaust valve (referred to herein as a blowdown exhaust valve, or blowdown valve) 8 and second exhaust valve (referred to herein as a scavenge exhaust valve, or scavenge valve) 6. The intake valves and exhaust valves may be referred to herein as cylinder intake valves and cylinder exhaust valves, respectively. As explained further below with reference to FIG. 2, a timing (e.g., opening timing, closing timing, opening duration, etc.) of each of the intake valves may be controlled via various camshaft timing systems. In one embodiment, both the first intake valves 2 and second intake valves 4 may be controlled to a same valve timing (e.g., such that they open and close at the same time in the engine cycle). In an alternate embodiment, the first intake valves 2 and second intake valves 4 may be controlled at a different valve timing. Further, the first exhaust valves 8 may be controlled at a different valve timing than the second exhaust valves 6 (e.g., such that a first exhaust valve and second exhaust valve of a same cylinder open at different times than one another and close at different times than one another), as discussed further below.

Each cylinder receives intake air (or a mixture of intake air and recirculated exhaust gas, as explained further below) from an intake manifold 44 via an air intake passage 28. Intake manifold 44 is coupled to the cylinders via intake ports (e.g., runners). For example, intake manifold 44 is shown in FIG. 1 coupled to each first intake valve 2 of each cylinder via first intake ports 20. Further, the intake manifold 44 is coupled to each second intake valve 4 of each cylinder via second intake ports 22. In this way, each cylinder intake port can selectively communicate with the cylinder it is coupled to via a corresponding one of the first intake valves 2 or second intake valves 4. Each intake port may supply air and/or fuel to the cylinder it is coupled to for combustion.

One or more of the intake ports may include a charge motion control device, such as a charge motion control valve (CMCV). As shown in FIG. 1, each first intake port 20 of each cylinder includes a CMCV 24. CMCVs 24 may also be referred to as swirl control valves or tumble control valves. CMCVs 24 may restrict airflow entering the cylinders via first intake valves 2. In the example of FIG. 1, each CMCV 24 may include a valve plate; however, other designs of the valve are possible. Note that for the purposes of this disclosure the CMCV 24 is in the "closed" position when it is fully activated and the valve plate may be fully tilted into the respective first intake port 20, thereby resulting in maximum air charge flow obstruction. Alternatively, the CMCV 24 is in the "open" position when deactivated and the valve plate may be fully rotated to lie substantially parallel with airflow, thereby considerably minimizing or eliminating airflow charge obstruction. The CMCVs may principally be maintained in their "open" position and may only be activated "closed" when swirl conditions are desired. As shown in FIG. 1, only one intake port of each cylinder includes the CMCV 24. However, in alternate embodiments, both intake ports of each cylinder may include a CMCV 24. The controller 12 may actuate the CMCVs 24 (e.g., via a valve actuator that may be coupled to a rotating shaft directly coupled to each CMCV 24) to move the CMCVs into the open or closed positions, or a plurality of positions between the open and closed positions, in response to engine operating conditions (such as engine speed/load and/or when blowthrough via the second exhaust valves 6 is active), as explained further below. As referred to herein, blowthrough air or blowthrough combustion cooling may refer to intake air that flows from the one or more intake valves of each cylinder to second exhaust valves 6 (and into second exhaust manifold 80) during a valve opening overlap period between the intake valves and second exhaust valves 6 (e.g., a period when both the intake valves and second exhaust valves 6 are open at the same time), without combusting the blowthrough air.

A high pressure, dual stage, fuel system (such as the fuel system shown in FIG. 2) may be used to generate fuel pressures at injectors 66. As such, fuel may be directly injected in the cylinders via injectors 66. Distributorless ignition system 88 provides an ignition spark to cylinders 12, 14, 16, and 18 via sparks plug 92 in response to controller 12. Cylinders 12, 14, 16, and 18 are each coupled to two exhaust ports for channeling the blowdown and scavenging portions of the combustion gases separately. Specifically, as shown in FIG. 1, cylinders 12, 14, 16, and 18 exhaust combustion gases (e.g., scavenging portion) to second exhaust manifold (referred to herein as a scavenge manifold) 80 via second exhaust runners (e.g., ports) 82 and combustion gases (e.g., blowdown portion) to first exhaust manifold (referred to herein as a blowdown manifold) 84 via first exhaust runners (e.g., ports) 86. Second exhaust runners 82 extend from cylinders 12, 14, 16, and 18 to second exhaust manifold 80. Additionally, first exhaust manifold 84 includes a first manifold portion 81 and second manifold portion 85. First exhaust runners 86 of cylinders 12 and 18 (referred to herein as the outside cylinders) extend from cylinders 12 and 18 to the second manifold portion 85 of first exhaust manifold 84. Additionally, first exhaust runners 86 of cylinders 14 and 16 (referred to herein as the inside cylinders) extend from cylinders 14 and 16 to the first manifold portion 81 of first exhaust manifold 84.

Each exhaust runner can selectively communicate with the cylinder it is coupled to via an exhaust valve. For example, second exhaust runners 82 communicate with their respective cylinders via second exhaust valves 6 and first exhaust runners 86 communicate with their respective cylinders via first exhaust valves 8. Second exhaust runners 82 are isolated from first exhaust runners 86 when at least one exhaust valve of each cylinder is in a closed position. Exhaust gases may not flow directly between exhaust runners 82 and 86. The exhaust system described above may be referred to herein as a split exhaust manifold system, where a first portion of exhaust gases from each cylinder are output to first exhaust manifold 84 and a second portion of exhaust gases from each cylinder are output to second exhaust manifold 80, and where the first and second exhaust manifolds do not directly communicate with one another (e.g., aside from the scavenge manifold bypass valve, no passage directly couples the two exhaust manifolds to one another and thus the first and second portions of exhaust gases do not mix with one another within the first and second exhaust manifolds).

Engine 10 includes a turbocharger including a dual-stage exhaust turbine 164 and an intake compressor 162 coupled on a common shaft. Dual-stage turbine 164 includes a first turbine 163 and second turbine 165. First turbine 163 is directly coupled to first manifold portion 81 of first exhaust manifold 84 and receives exhaust gases only from cylinders 14 and 16 via first exhaust valves 8 of cylinders 14 and 16. Second turbine 165 is directly coupled to second manifold portion 85 of first exhaust manifold 84 and receives exhaust gases only from cylinders 12 and 18 via first exhaust valves 8 of cylinders 12 and 18. Rotation of first and second turbines drives rotation of compressor 162 disposed within the intake passage 28. As such, the intake air becomes boosted (e.g., pressurized) at the compressor 162 and travels downstream to intake manifold 44. Exhaust gases exit both first turbine 163 and second turbine 165 into common exhaust passage 74. A wastegate may be coupled across the dual-stage turbine 164. Specifically, wastegate valve 76 may be included in a bypass 78 coupled between each of the first manifold portion 81 and second manifold portion 85, upstream of an inlet to dual-stage turbine 164, and exhaust passage 74, downstream of an outlet of dual-stage turbine 164. In this way, a position of wastegate valve (referred to herein as a turbine wastegate) 76 controls an amount of boost provided by the turbocharger. In alternate embodiments, engine 10 may include a single stage turbine where all exhaust gases from the first exhaust manifold 84 are directed to an inlet of a same turbine.

Exhaust gases exiting dual-stage turbine 164 flow downstream in exhaust passage 74 to a first emission control device 70 and a second emission control device 72, second emission control device 72 arranged downstream in exhaust passage 74 from first emission control device 70. Emission control devices 70 and 72 may include one or more catalyst bricks, in one example. In some examples, emission control devices 70 and 72 may be three-way type catalysts. In other examples, emission control devices 70 and 72 may include one or a plurality of a diesel oxidation catalyst (DOC), and a selective catalytic reduction catalyst (SCR). In yet another example, second emission control device 72 may include a gasoline particulate filter (GPF). In one example, first emission control device 70 may include a catalyst and second emission control device 72 may include a GPF. After passing through emission control devices 70 and 72, exhaust gases may be directed out to a tailpipe.

Exhaust passage 74 further includes a plurality of exhaust sensors in electronic communication with controller 12 of control system 15, as described further below. As shown in FIG. 1, exhaust passage 74 includes a first oxygen sensor 90 positioned between first emission control device 70 and second emission control device 72. First oxygen sensor 90 may be configured to measure an oxygen content of exhaust gas entering second emission control device 72. Exhaust passage 74 may include one or more additional oxygen sensors positioned along exhaust passage 74, such as second oxygen sensor 91 positioned between dual-stage turbine 164 and first emission control device 70 and/or third oxygen sensor 93 positioned downstream of second emission control device 72. As such, second oxygen sensor 91 may be configured to measure the oxygen content of the exhaust gas entering first emission control device 70 and third oxygen sensor 93 may be configured to measure the oxygen content of exhaust gas exiting second emission control device 72. In one embodiment, the one or more oxygen sensor 90, 91, and 93 may be Universal Exhaust Gas Oxygen (UEGO) sensors. Alternatively, a two-state exhaust gas oxygen sensor may be substituted for oxygen sensors 90, 91, and 93. Exhaust passage 74 may include various other sensors, such as one or more temperature and/or pressure sensors. For example, as shown in FIG. 1, a pressure sensor 96 is positioned within exhaust passage 74, between first emission control device 70 and second emission control device 72. As such, pressure sensor 96 may be configured to measure the pressure of exhaust gas entering second emission control device 72. Both pressure sensor 96 and oxygen sensor 90 are arranged within exhaust passage 74 at a point where a flow passage 98 couples to exhaust passage 74. Flow passage 98 may be referred to herein as a scavenge manifold bypass passage (SMBP) 98. Scavenge manifold bypass passage 98 is directly coupled to and between second exhaust (e.g., scavenge) manifold 80 and exhaust passage 74. A valve 97 (referred to herein as the scavenge manifold bypass valve, SMBV) is disposed within scavenge manifold bypass passage 98 and is actuatable by controller 12 to adjust an amount of exhaust flow from second exhaust manifold 80 to exhaust passage 74, at a location between first emission control device 70 and second emission control device 72.

Second exhaust manifold 80 is directly coupled to a first exhaust gas recirculation (EGR) passage 50. First EGR passage 50 is a coupled directly between second exhaust manifold 80 and intake passage 28, upstream of compressor (e.g., turbocharger compressor) 162 (and thus may be referred to as a low-pressure EGR passage). As such, exhaust gases (or blowthrough air, as explained further below) is directed from second exhaust manifold 80 to intake passage 28, upstream of compressor 162, via first EGR passage 50. As shown in FIG. 1, first EGR passage 50 includes an EGR cooler 52 configured to cool exhaust gases flowing from second exhaust manifold 80 to intake passage 28 and a first EGR valve 54 (which may be referred to herein as the BTCC valve). Controller 12 is configured to actuate and adjust a position of first EGR valve 54 in order to control an amount of air flow through first EGR passage 50. When first EGR valve 54 is in a closed position, no exhaust gases or intake air may flow from second exhaust manifold 80 to intake passage 28, upstream of compressor 162. Further, when first EGR valve 54 is in an open position, exhaust gases and/or blowthrough air may flow from second exhaust manifold 80 to intake passage 28, upstream of compressor 162. Controller 12 may additionally adjust first EGR valve 54 into a plurality of positions between fully open and fully closed.

A first ejector 56 is positioned at an outlet of EGR passage 50, within intake passage 28. First ejector 56 may include a constriction or venturi that provides a pressure increase at the inlet of the compressor 162. As a result, EGR from the EGR passage 50 may be mixed with fresh air flowing through the intake passage 28 to the compressor 162. Thus, EGR from the EGR passage 50 may act as the motive flow on the first ejector 56. In an alternate embodiment, there may not be an ejector positioned at the outlet of EGR passage 50. Instead, an outlet of compressor 162 may be shaped as an ejector that lowers the gas pressure to assist in EGR flow (and thus, in this embodiment, air is the motive flow and EGR is the secondary flow). In yet another embodiment, EGR from EGR passage 50 may be introduced at the trailing edge of a blade of compressor 162, thereby allowing blowthrough air to intake passage 28 via EGR passage 50.

A second EGR passage 58 is coupled between first EGR passage 50 and intake passage 28. Specifically, as shown in FIG. 1, second EGR passage 58 is coupled to first EGR passage 50, between EGR valve 54 and EGR cooler 52. In alternate embodiments, when second EGR passage 58 is included in the engine system, the system may not include EGR cooler 52. Additionally, second EGR passage 58 is directly coupled to intake passage 28, downstream of compressor 162. Due to this coupling, second EGR passage 58 may be referred to herein as a mid-pressure EGR passage. Further, as shown in FIG. 1, second EGR passage 58 is coupled to intake passage 28 upstream of a charge air cooler (CAC) 40. CAC 40 is configured to cool intake air (which may be a mixture of fresh intake air from outside of the engine system and exhaust gases) as it passes through CAC 40. As such, recirculated exhaust gases from first EGR passage 50 and/or second EGR passage 58 may be cooled via CAC 40 before entering intake manifold 44. In an alternate embodiment, second EGR passage 58 may be coupled to intake passage 28, downstream of CAC 40. In this embodiment, there may be no EGR cooler 52 disposed within first EGR passage 50. Further, as shown in FIG. 1, a second ejector 57 may be positioned within intake passage 28, at an outlet of second EGR passage 58.

A second EGR valve 59 (e.g., mid-pressure EGR valve) is disposed within second EGR passage 58. Second EGR valve 59 is configured to adjust an amount of gas flow (e.g., intake air or exhaust) through second EGR passage 58. As described further below, controller 12 may actuate EGR valve 59 into an open position (allowing flow thorough second EGR passage 58), closed position (blocking flow through second EGR passage 58), or plurality of positions between fully open and fully closed based on (e.g., as a function of) engine operating conditions. For example, actuating the EGR valve 59 may include the controller 12 sending an electronic signal to an actuator of the EGR valve 59 to move a valve plate of EGR valve 59 into an open position, closed position, or some position between fully open and fully closed. As also explained further below, based on system pressures and positons of alternate valves in the engine system, air may either flow toward intake passage 28 within second EGR passage 58 or toward second exhaust manifold 80 within second EGR passage 58.

Intake passage 28 further includes an electronic intake throttle 62 in communication with intake manifold 44. As shown in FIG. 1, intake throttle 62 is positioned downstream of CAC 40. The position of a throttle plate 64 of throttle 62 can be adjusted by control system 15 via a throttle actuator (not shown) communicatively coupled to controller 12. By modulating air intake throttle 62, while operating compressor 162, an amount of fresh air may be inducted from the atmosphere and/or an amount of recirculated exhaust gas from the one or more EGR passages into engine 10, cooled by CAC 40 and delivered to the engine cylinders at compressor (or boosted) pressure via intake manifold 44. To reduce compressor surge, at least a portion of the aircharge compressed by compressor 162 may be recirculated to the compressor inlet. A compressor recirculation passage 41 may be provided for recirculating compressed air from the compressor outlet, upstream of CAC 40, to the compressor inlet. Compressor recirculation valve (CRV) 42 may be provided for adjusting an amount of recirculation flow recirculated to the compressor inlet. In one example, CRV 42 may be actuated open via a command from controller 12 in response to actual or expected compressor surge conditions.

A third flow passage 30 (which may be referred to herein as a hot pipe) is coupled between second exhaust manifold 80 and intake passage 28. Specifically, a first end of third flow passage 30 is directly coupled to second exhaust manifold 80 and a second end of third flow passage 30 is directly coupled to intake passage 28, downstream of intake throttle 62 and upstream of intake manifold 44. A third valve 32 (e.g., hot pipe valve) is disposed within third flow passage 30 and is configured to adjust an amount of air flow through third flow passage 30. Third valve 32 may be actuated into a fully open position, fully closed position, or a plurality of positions between fully open and fully closed in response to an actuation signal sent to an actuator of third valve 32 from controller 12.

Second exhaust manifold 80 and/or second exhaust runners 82 may include one or more sensors (such as pressure, oxygen, and/or temperature sensors) disposed therein. For example, as shown in FIG. 1, second exhaust manifold 80 includes a pressure sensor 34 and oxygen sensor 36 disposed therein and configured to measure a pressure and oxygen content, respectively, of exhaust gases and blowthrough (e.g., intake) air, exiting second exhaust valves 6 and entering second exhaust manifold 80. Additionally or alternatively to oxygen sensor 36, each second exhaust runner 82 may include an individual oxygen sensor 38 disposed therein. As such, an oxygen content of exhaust gases and/or blowthrough air exiting each cylinder via second exhaust valves 6 may be determined based on an output of oxygen sensors 38.

In some embodiments, as shown in FIG. 1, intake passage 28 may include an electric compressor 60. Electric compressor 60 is disposed in a bypass passage 61 which is coupled to intake passage 28, upstream and downstream of an electric compressor valve 63. Specifically, an inlet to bypass passage 61 is coupled to intake passage 28 upstream of electric compressor valve 63 and an outlet to bypass passage 61 is coupled to intake passage 28 downstream of electric compressor valve 63 and upstream of where first EGR passage 50 couples to intake passage 28. Further, the outlet of bypass passage 61 is coupled upstream in intake passage 28 from turbocharger compressor 162. Electric compressor 60 may be electrically driven by an electric motor using energy stored at an energy storage device. In one example, the electric motor may be part of electric compressor 60, as shown in FIG. 1. When additional boost (e.g., increased pressure of the intake air above atmospheric pressure) is requested, over an amount provided by compressor 162, controller 12 may activate electric compressor 60 such that it rotates and increases a pressure of intake air flowing through bypass passage 61. Further, controller 12 may actuate electric compressor valve 63 into a closed or partially closed position to direct an increased amount of intake air through bypass passage 61 and electric compressor 60.

Intake passage 28 may include one or more additional sensors (such as additional pressure, temperature, flow rate, and/or oxygen sensors). For example, as shown in FIG. 1, intake passage 28 includes a mass air flow (MAF) sensor 48 disposed upstream of compressor 162, electric compressor valve 63, and where first EGR passage 59 couples to intake passage 28. An intake pressure sensor 31 and intake temperature sensor 33 are positioned in intake passage 28, upstream of compressor 162 and downstream of where first EGR passage 50 couples to intake passage 28. An intake oxygen sensor 35 and an intake temperature sensor 43 may be located in intake passage 28, downstream of compressor 162 and upstream of CAC 40. An additional intake pressure sensor 37 may be positioned in intake passage 28, downstream of CAC 40 and upstream of throttle 28. In some embodiments, as shown in FIG. 1, an additional intake oxygen sensor 39 may be positioned in intake passage 28, between CAC 40 and throttle 28. Further, an intake manifold pressure (e.g., MAP) sensor 122 and intake manifold temperature sensor 123 are positioned within intake manifold 44, upstream of all engine cylinders.

In some examples, engine 10 may be coupled to an electric motor/battery system (as shown in FIG. 2) in a hybrid vehicle. The hybrid vehicle may have a parallel configuration, series configuration, or variation or combinations thereof. Further, in some embodiments, other engine configurations may be employed, for example a diesel engine.

Engine 10 may be controlled at least partially by a control system 15 including controller 12 and by input from a vehicle operator via an input device (not shown in FIG. 1). Control system 15 is shown receiving information from a plurality of sensors 16 (various examples of which are described herein) and sending control signals to a plurality of actuators 81. As one example, sensors 16 may include pressure, temperature, and oxygen sensors located within the intake passage 28, intake manifold 44, exhaust passage 74, and second exhaust manifold 80, as described above. Other sensors may include a throttle inlet pressure (TIP) sensor for estimating a throttle inlet pressure (TIP) and/or a throttle inlet temperature sensor for estimating a throttle air temperature (TCT) coupled downstream of the throttle in the intake passage. Additional system sensors and actuators are elaborated below with reference to FIG. 2. As another example, actuators 81 may include fuel injectors, valves 63, 42, 54, 59, 32, 97, 76, and throttle 62. Actuators 81 may further includes various camshaft timing actuators coupled to the cylinder intake and exhaust valves (as described further below with reference to FIG. 2). Controller 12 may receive input data from the various sensors, process the input data, and trigger the actuators in response to the processed input data based on instruction or code programmed in a memory of controller 12 corresponding to one or more routines. Example control routines (e.g., methods) are described herein at FIG. 3. For example, adjusting EGR flow from second exhaust manifold 80 to intake passage 28 may include adjusting an actuator of first EGR valve 54 to adjust an amount of exhaust flow flowing to intake passage 28, upstream of compressor 162, from second exhaust manifold 80. In another example, adjusting EGR flow from second exhaust manifold 80 to intake passage 28 may include adjusting an actuator of an exhaust valve camshaft to adjust an opening timing of second exhaust valves 6.

In this way, the first and second exhaust manifolds of FIG. 1 may be designed to separately channel the blowdown and scavenging portions of the exhaust. First exhaust manifold 84 may channel the blowdown pulse of the exhaust to dual-stage turbine 164 via first manifold portion 81 and second manifold portion 85 while second exhaust manifold 80 may channel the scavenging portion of exhaust to intake passage 28 via one or more of first EGR passage 50 and second EGR passage 58 and/or to exhaust passage 74, downstream of the dual-stage turbine 164, via flow passage 98. For example, first exhaust valves 8 channel the blowdown portion of the exhaust gases through first manifold 84 to the dual-stage turbine 164 and both first and second emission control device 70 and 72 while second exhaust valves 6 channel the scavenging portion of exhaust gases through second exhaust manifold 80 and to either intake passage 28 via one or more EGR passages or exhaust passage 74 and second emission control device 72 via flow passage 98.

It should be noted that while FIG. 1 shows engine 10 including each of first EGR passage 50, second EGR passage 58, flow passage 98, and flow passage 30, in alternate embodiments, engine 10 may only include a portion of these passages. For example, in one embodiment, engine 10 may only include first EGR passage 50 and flow passage 98 and not include second EGR passage 58 and flow passage 30. In another embodiment, engine 10 may include first EGR passage 50, second EGR passage 58, and flow passage 98, but not include flow passage 30. In yet another embodiment, engine 10 may include first EGR passage 50, flow passage 30, and flow passage 98, but not second EGR passage 58. In some embodiments, engine 10 may not include electric compressor 60. In still other embodiments, engine 10 may include all or only a portion of the sensors shown in FIG. 1.

Referring now to FIG. 2, it depicts a partial view of a single cylinder of internal combustion engine 10 which may be installed in a vehicle 100. As such, components previously introduced in FIG. 1 are represented with the same reference numbers and are not re-introduced. Engine 10 is depicted with combustion chamber (cylinder) 130, coolant sleeve 114, and cylinder walls 132 with piston 136 positioned therein and connected to crankshaft 140. Combustion chamber 130 is shown communicating with intake passage 146 and exhaust passage 148 via respective intake valve 152 and exhaust valve 156. As previously described in FIG. 1, each cylinder of engine 10 may exhaust combustion products along two conduits. In the depicted view, exhaust passage 148 represents the first exhaust runner (e.g., port) leading from the cylinder to the turbine (such as first exhaust runner 86 of FIG. 1) while the second exhaust runner is not visible in this view.

As also previously elaborated in FIG. 1, each cylinder of engine 10 may include two intake valves and two exhaust valves. In the depicted view, intake valve 152 and exhaust valve 156 are located at an upper region of combustion chamber 130. Intake valve 152 and exhaust valve 156 may be controlled by controller 12 using respective cam actuation systems including one or more cams. The cam actuation systems may utilize one or more of cam profile switching (CPS), variable cam timing (VCT), variable valve timing (VVT) and/or variable valve lift (VVL) systems to vary valve operation. In the depicted example, each intake valve 152 is controlled by an intake cam 151 and each exhaust valve 156 is controlled by an exhaust cam 153. The intake cam 151 may be actuated via an intake valve timing actuator 101 and the exhaust cam 153 may be actuated via an exhaust valve timing actuator 103 according to set intake and exhaust valve timings, respectively. In some examples, the intake valves and exhaust valves may be deactivated via the intake valve timing actuator 101 and exhaust valve timing actuator 103, respectively. For example, the controller may send a signal to the exhaust valve timing actuator 103 to deactivated the exhaust valve 156 such that it remains closed and does not open at its set timing. The position of intake valve 152 and exhaust valve 156 may be determined by valve position sensors 155 and 157, respectively. As introduced above, in one example, all exhaust valves of every cylinder may be controlled on a same exhaust camshaft. As such, both a timing of the scavenge (second) exhaust valves and the blowdown (first) exhaust valves may be adjusted together via one camshaft, but they may each have different timings relative to one another. In another example, the scavenge exhaust valve of every cylinder may be controlled on a first exhaust camshaft and a blowdown exhaust valve of every cylinder may be controlled on a different, second exhaust camshaft. In this way, the valve timing of the scavenge valves and blowdown valves may be adjusted separately from one another. In alternate embodiments, the cam or valve timing system(s) of the scavenge and/or blowdown exhaust valves may employ a cam in cam system, an electro-hydraulic type system on the scavenge valves, and/or an electro-mechanical valve lift control on the scavenge valves.

For example, in some embodiments, the intake and/or exhaust valve may be controlled by electric valve actuation. For example, cylinder 130 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

In one example, intake cam 151 includes separate and different cam lobes that provide different valve profiles (e.g., valve timing, valve lift, duration, etc.) for each of the two intake valves of combustion chamber 130. Likewise, exhaust cam 153 may include separate and different cam lobes that provide different valve profiles (e.g., valve timing, valve lift, duration, etc.) for each of the two exhaust valves of combustion chamber 130. In another example, intake cam 151 may include a common lobe, or similar lobes, that provide a substantially similar valve profile for each of the two intake valves.

In addition, different cam profiles for the different exhaust valves can be used to separate exhaust gases exhausted at low cylinder pressure from exhaust gases exhausted at exhaust pressure. For example, a first exhaust cam profile can open from closed position the first exhaust valve (e.g., blowdown valve) just before BDC (bottom dead center) of the power stroke of combustion chamber 130 and close the same exhaust valve well before top dead center (TDC) to selectively exhaust blowdown gases from the combustion chamber. Further, a second exhaust cam profile can be positioned to open from close a second exhaust valve (e.g., scavenge valve) before a mid-point of the exhaust stroke and close it after TDC to selectively exhaust the scavenging portion of the exhaust gases.

Thus, the timing of the first exhaust valve and the second exhaust valve can isolate cylinder blowdown gases from scavenging portion of exhaust gases while any residual exhaust gases in the clearance volume of the cylinder can be cleaned out with fresh intake air blowthrough during positive valve overlap between the intake valve and the scavenge exhaust valves. By flowing a first portion of the exhaust gas leaving the cylinders (e.g., higher pressure exhaust) to the turbine(s) and a higher pressure exhaust passage and flowing a later, second portion of the exhaust gas (e.g., lower pressure exhaust) and blowthrough air to the compressor inlet, the engine system efficiency is improved. Turbine energy recovery may be enhanced and engine efficiency may be improved via increased EGR and reduced knock.

Continuing with FIG. 2, exhaust gas sensor 126 is shown coupled to exhaust passage 148. Sensor 126 may be positioned in the exhaust passage upstream of one or more emission control devices, such as devices 70 and 72 of FIG. 1. Sensor 126 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. The downstream emission control devices may include one or more of a three way catalyst (TWC), NOx trap, GPF, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc.

Cylinder 130 can have a compression ratio, which is the ratio of volumes when piston 136 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 92 for initiating combustion. Ignition system 188 can provide an ignition spark to combustion chamber 130 via spark plug 92 in response to spark advance signal SA from controller 12, under select operating modes. However, in some embodiments, spark plug 92 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 130 is shown including one fuel injector 66. Fuel injector 66 is shown coupled directly to combustion chamber 130 for injecting fuel directly therein in proportion to the pulse width of signal FPW received from controller 12 via electronic driver 168. In this manner, fuel injector 66 provides what is known as direct injection (hereafter also referred to as "DI") of fuel into combustion cylinder 130. While FIG. 2 shows injector 66 as a side injector, it may also be located overhead of the piston, such as near the position of spark plug 92. Such a position may improve mixing and combustion when operating the engine with an alcohol-based fuel due to the lower volatility of some alcohol-based fuels. Alternatively, the injector may be located overhead and near the intake valve to improve mixing. In an alternate embodiment, injector 66 may be a port injector providing fuel into the intake port upstream of cylinder 130.

Fuel may be delivered to fuel injector 66 from a high pressure fuel system 180 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. Fuel tanks in fuel system 180 may hold fuel with different fuel qualities, such as different fuel compositions. These differences may include different alcohol content, different octane, different heat of vaporizations, different fuel blends, and/or combinations thereof etc. In some embodiments, fuel system 180 may be coupled to a fuel vapor recovery system including a canister for storing refueling and diurnal fuel vapors. The fuel vapors may be purged from the canister to the engine cylinders during engine operation when purge conditions are met. For example, the purge vapors may be naturally aspirated into the cylinder via the first intake passage at or below barometric pressure.

Engine 10 may be controlled at least partially by controller 12 and by input from a vehicle operator 113 via an input device 118 such as an accelerator pedal 116. The input device 118 sends a pedal position signal to controller 12. Controller 12 is shown in FIG. 2 as a microcomputer, including a microprocessor unit 102, input/output ports 104, an electronic storage medium for executable programs and calibration values shown as a read only memory 106 in this particular example, random access memory 108, keep alive memory 110, and a data bus. Storage medium read-only memory 106 can be programmed with computer readable data representing instructions executable by microprocessor 102 for performing the methods and routines described below as well as other variants that are anticipated but not specifically listed. Controller 12 may receive various signals from sensors coupled to engine 10, in addition to those signals previously discussed, including measurement of inducted mass air flow (MAF) from mass air flow sensor 48; engine coolant temperature (ECT) from temperature sensor 112 coupled to coolant sleeve 114; a profile ignition pickup signal (PIP) from Hall effect sensor 120 (or other type) coupled to crankshaft 140; throttle position (TP) from a throttle position sensor; absolute manifold pressure signal (MAP) from sensor 122, cylinder AFR from EGO sensor 126, and abnormal combustion from a knock sensor and a crankshaft acceleration sensor. Engine speed signal, RPM, may be generated by controller 12 from signal PIP. Manifold pressure signal MAP from a manifold pressure sensor may be used to provide an indication of vacuum, or pressure, in the intake manifold.

Based on input from one or more of the above-mentioned sensors, controller 12 may adjust one or more actuators, such as fuel injector 66, throttle 62, spark plug 92, intake/exhaust valves and cams, etc. The controller may receive input data from the various sensors, process the input data, and trigger the actuators in response to the processed input data based on instruction or code programmed therein corresponding to one or more routines.

In some examples, vehicle 100 may be a hybrid vehicle with multiple sources of torque available to one or more vehicle wheels 160. In other examples, vehicle 100 is a conventional vehicle with only an engine, or an electric vehicle with only electric machine(s). In the example shown in FIG. 2, vehicle 100 includes engine 10 and an electric machine 161 coupled along a main drivetrain 197. Main drivetrain 197 is coupled to a first end of crankshaft 140 and includes components that drive the vehicle wheels 160. Electric machine 161 may be a motor or a motor/generator and thus may also be referred to herein as an electric motor. Crankshaft 140 of engine 10 and electric machine 161 are connected via a transmission 167 to vehicle wheels 160 when one or more clutches 166 are engaged. In the depicted example, a first clutch 166 is provided between crankshaft 140 and electric machine 161, and a second clutch 166 is provided between electric machine 161 and transmission 167. Controller 12 may send a signal to an actuator of each clutch 166 to engage or disengage the clutch, so as to connect or disconnect crankshaft 140 from electric machine 161 and the components connected thereto, and/or connect or disconnect electric machine 161 from transmission 167 and the components connected thereto. Transmission 167 may be a gearbox, a planetary gear system, or another type of transmission. The powertrain may be configured in various manners including as a parallel, a series, or a series-parallel hybrid vehicle.

Electric machine 161 receives electrical power from a traction battery 170 to provide torque to vehicle wheels 160. Electric machine 161 may also be operated as a generator to provide electrical power to charge battery 170, for example during a braking operation.

A front end accessory drive (FEAD) 198 is coupled to a second, opposite end of crankshaft 140. The second end, or accessory drive end, is a free end, or an exposed end of the crankshaft that is free and drives one or more auxiliary apparatuses (e.g., accessories) via a tensioning device 199 (e.g., a belt, chain, etc.) coupled to one or more auxiliary pulleys (not shown). As such, this end lies opposite to the end of the crankshaft that drives the vehicle. One or more clutches 196 may couple the FEAD 198 to various auxiliary devices or actuators driven by the FEAD 198. In one example, as depicted, the FEAD 198 drives an air conditioning (AC) compressor 190 of a heating ventilation and air conditioning (HVAC) system 192 of the vehicle. The HVAC system is a coolant and/or refrigerant based system including additional blowers, condensers, and pumps which is configured to provide vehicle cabin cooling or heating based on operator input (such as based on an operator selected cabin temperature setpoint). When operated, the AC compressor 190 compresses refrigerant flowing through an HVAC refrigerant line, so as to convert gaseous refrigerant to liquid refrigerant, before liquid refrigerant is directed to an AC evaporator for cabin cooling. While the example shows the AC compressor 190 as the auxiliary apparatus or actuator driven by the FEAD 198, this is not meant to be limiting. The FEAD 198 may similarly drive one or more other or additional auxiliary apparatuses including a camshaft, an alternator, a power steering compressor, an automatic transmission hydraulic fluid pump (e.g., oil pump), etc.

As elaborated herein, the inventors have recognized that when an idle-stopped engine has to be restarted for the purpose of driving an auxiliary device coupled to the FEAD, engine combustion torque may not be necessarily required. During those conditions, as elaborated at FIG. 3, the engine may be restarted by spinning the engine via an electric machine (such as electric machine 161 of FIG. 2), enabling the FEAD to be rotated which in turn drives the associated auxiliary device or actuator. As a result, engine fueling can be held disabled for a longer duration.

Figure 3:
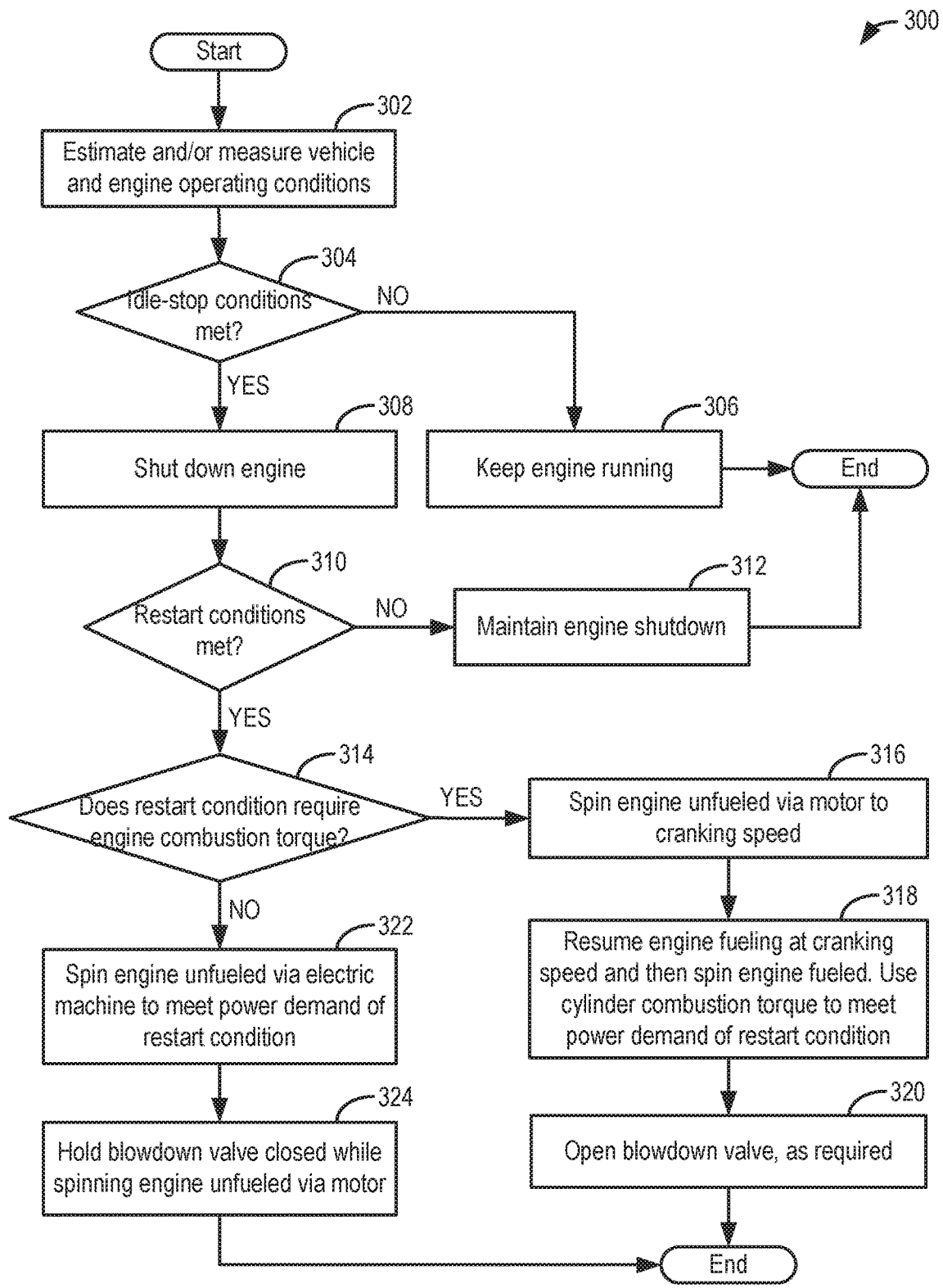
FIG. 3 shows an example method for selectively restarting an engine from idle-stop by spinning an engine unfueled.

Turning now to FIG. 3, an example method 300 is shown for selecting restarting an engine from idle-stop by spinning the engine unfueled via a motor. During other conditions, the engine may be restarted by resuming cylinder combustion. Instructions for carrying out method 300 may be executed by a controller based on instructions stored on a memory of the controller and in conjunction with signals received from sensors of the engine system, such as the sensors described above with reference to FIGS. 1-2. The controller may employ engine actuators of the engine system to adjust engine operation, according to the methods described below.

At 302, engine operating conditions may be estimated and/or measured. These include, for example, engine speed, engine temperature, torque demand, boost pressure, MAP, MAF, etc. At 304, the method includes confirming that idle stop conditions are present. Idle stop conditions may include, for example, the engine operating (e.g., carrying out combustion), the state of charge (SOC) of a system battery being higher than a preset minimum threshold (e.g., at least 30% charged, vehicle running speed being below a threshold speed (e.g., below 30 mph), a request for air conditioning or cabin cooling not being issued, an intake air temperature being within a selected temperature range, a driver requested torque being less than a predetermined threshold value, and an emission control device temperature being higher than a threshold temperature. If any of the idle stop conditions are not met, then at 306, the method keeps the engine running and combusting fuel. The routine then exits. Else, if all the idle stop conditions are met, then at 308, the engine may be shut down. This includes disabling cylinder fueling and spinning the engine down to rest.

In one example, the blow down valve is closed when the engine is spinning and combustion has ceased. As a result, the engine does not exhaust unburnt air into the exhaust path where it would subsequently require regenerating (re-centering) the catalyst. The scavenge valve can be in any position if one only considers preventing unburnt air from entering the exhaust path. However, the controller may alternatively choose a position of the scavenge valve that minimizes pumping losses in an effort to maximize brake energy regeneration. Closed blow down valves do this by creating an air spring in the cylinder. But, if the torque pulses cause engine shutdown shake, which is likely, then a better scavenge valve position is open during the exhaust stroke. Thus, in one example, while the blow down valve is held closed when the engine is spinning unfueled via the motor, the controller may open the scavenge valves of the cylinders during the compression stroke to reduce compression torque, thus markedly reducing shutdown shake.

The method then moves to 310 to determine if automatic engine restart conditions are satisfied. The automatic engine restart conditions may include conditions that cause the engine to be automatically restarted, without requiring operator input, from a state of idle-stop. It will be appreciated that during the idle-stop, the engine is shutdown but the vehicle is maintained on. For example, a vehicle controller and various control modules may remain on to monitor vehicle and engine component conditions over the restart. In addition, various sensors may remain maintained on. Thus the restart is with the vehicle maintained on from before the most recent engine shutdown continuously up to and through the current requested restart.

Example restart conditions include a request for torque, such as inferred from release of a brake pedal or application of an accelerator pedal, a request for air conditioning that requires an AC compressor to be operated, the SOC of a battery falling below a predetermined threshold (such as below 30% SOC), engine or exhaust catalyst temperature falling below a threshold. Accordingly, engine starting may be requested to charge the battery to a desired value, vehicle speed higher than a threshold (e.g., above 3 mph), etc. Any one of the restart conditions may be met for automatic engine restart conditions to be considered confirmed, unlike idle-stop condition which require all engine idle-stop conditions to be confirmed. If none of the restart conditions are met, then at 312, the engine may be maintained shutdown.

If engine restart conditions are met, then at 314, it may be determined if the restart condition triggering the current engine restart is a condition that requires engine combustion torque. As such, some of the engine restart conditions may require engine combustion torque, such as to propel the vehicle, raise exhaust catalyst temperature, raise engine temperature, etc. However, the inventors have recognized that during other restart conditions, combustion torque is not necessary. For example, when an engine restart is requested to drive an AC compressor to provide cabin cooling, or to drive an automatic transmission oil pump, engine combustion torque is not required. The transmission is hydraulically actuated and thus hydraulic power is required to maintain/change its state. Hydraulic power is stored in an accumulator but the accumulator is filled via a hydraulic pump driven by the engine output shaft. The engine may provide positive torque for propulsion or powering accessories or it may provide negative torque for driving the FEAD and thus the electric machine used for brake energy regeneration. Either way, the transmission needs to be controlled to transmit torque in the appropriate manner. Thus if the transmission hydraulic actuation pressure is below a threshold pressure, pump operation may be required to raise the pressure. However, this does not require engine combustion torque. Engine combustion torque may also not be necessarily required to operate one or more actuators that are coupled to a front end accessory drive (FEAD) coupled to the engine. Restarting the engine and combusting fueling therein to deliver the power to drive the AC compressor may result in a fuel penalty that outweighs the fuel economy benefit of the earlier idle-stop.

Other scenarios of unfueled engine operation includes spinning the engine up before commencing combustion torque (that is, during a starting operation). Also, the engine is spun down once combustion torque is not required. Also, it includes brake energy regeneration when the vehicle is slowed to convert the vehicle kinetic energy into electrical energy for storage. A typical FEAD accessory is an AC compressor but in some cases might also include a hydraulic pump for steering or brakes, or a vacuum pump for vacuum powered devices.

Figure 6:
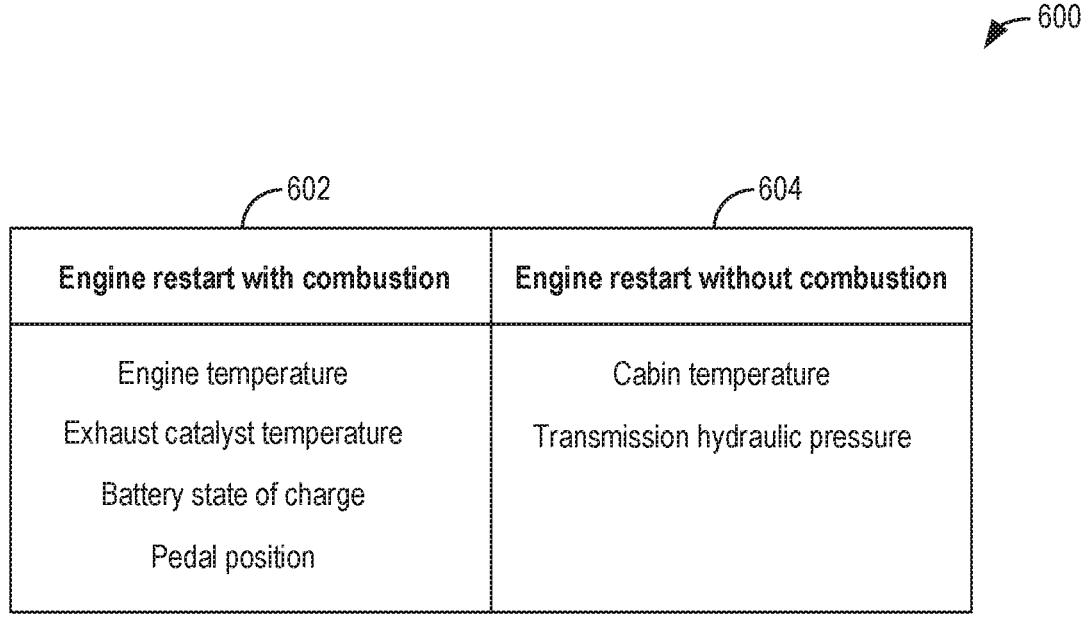
FIG. 6 shows a table listing parameters that are used to determine whether to restart an engine from idle-stop with or without engine combustion torque.

In one example, the controller may refer a look-up table, such as the table of FIG. 6, to assess a plurality of parameters based on which the controller may determine whether engine combustion torque is required at the restart. Table 600 of FIG. 6 lists example parameters that may trigger a fueled engine restart at 602. The parameters listed at 602 may be parameters that require engine combustion torque to be maintained within a desired operating range. Thus, the controller may monitor all the parameters listed at table 600 while an engine is shutdown (such as based on corresponding sensor input) and if any of the parameters listed at 602 fall outside their corresponding target range, a fueled engine restart is triggered. The fueled engine restart includes an initial cranking of the engine via a motor up until a cranking speed is reached, followed by engine fuel delivery.

In comparison, example parameters that may trigger an unfueled engine restart are listed at 604. The parameters listed at 604 may be parameters that do not require engine combustion torque to be maintained within a desired operating range. The controller may monitor all the parameters listed at table 600 while an engine is shutdown (such as based on corresponding sensor input) and if any of the parameters listed at 604 fall outside their corresponding target range, an unfueled engine restart is triggered. The unfueled engine restart includes the engine being spun via a motor while engine fuel delivery is maintained disabled, even after a cranking speed is reached or exceeded.

A controller may restart the engine if engine temperature is low and passenger requested cabin heating is needed. Exhaust catalyst temperature so low that excess emissions may occur is re-started at a lower catalyst temperature. Cabin temperature might indicate the occupant will want heat and thus the engine coolant needs to be heated for that purpose. Battery state of charge and pedal position might indicate a larger torque only available via combustion is required.

Thus if it is a restart condition that requires engine combustion torque (such as to heat an exhaust catalyst or increase engine load), at 316, the method includes restarting engine operation by cranking the engine. This includes spinning the engine, unfueled, via an electric starter motor, up to a cranking speed (e.g., to 400 rpm). Then, once the cranking speed is reached, at 318, engine fueling is resumed and the engine is spun, fueled. After the cranking speed is reached, the engine is able to sustain rotation using combustion torque. In one example, during an engine restart with combustion torque, the engine is spun unfueled via the motor for a first, shorter duration, such as 2 engine rotations. Once the engine is restarted, engine combustion torque is used to meet the power demand for the restart triggering condition. For example, combustion torque may be used to propel or launch the vehicle, or heat an exhaust catalyst. Herein, the combustion torque may be used to rotate a shaft that couples the engine to a vehicle drivetrain, and vehicle wheels. At 320, while spinning the engine fueled, the position of the blowdown exhaust valve of each cylinder is adjusted based on engine operating conditions. For example, the blow-down valve is the first valve to open thus directing the pressurized or high velocity exhaust gas to the turbine. The scavenge valve opens later (after the opening of the blow down valve) but for most of the exhaust stroke. Thus the contoller may choose to use both valves to get the exhaust out of the cylinder. This allows exhaust to flow through cylinder exhaust valves to an exhaust manifold and through a turbine to power a coupled compressor and/or onwards to an exhaust catalyst.

If a restart condition that does not require engine combustion torque is confirmed at 314, such as an engine restart to power an AC compressor or a transmission oil pump, then at 322, the method includes spinning the engine, unfueled, via an electric motor of the vehicle. In one example, the electric motor is the starter motor. In another example, the electric motor is an electric drive motor. Further still, the electric motor may be a belt integrated starter generator (BISG) of the vehicle's drivetrain. Herein the engine may be spun by the motor at a speed that is higher than the cranking speed. In addition, the engine may be spun by the motor for a longer duration than the cranking performed at 316. In one example, during an engine restart without combustion torque, the engine is spun unfueled via the motor for a second, longer duration, such as 4 engine rotations. In addition, engine fueling is maintained disabled, by deactivating engine cylinder fuel injectors, for the entire duration of the engine being spun unfueled via the motor.

For example, responsive to selected restart conditions being met, where combustion torque is not required, the controller may operate the motor to spin the engine unfueled and maintain engine fueling deactivated even after the engine reaches or exceeds cranking speed. In other words, even after the engine reaches a speed where combustion is reliable for maintaining engine rotation, fueling remains disabled. In particular, for the entire duration of the engine being spun by the motor, cylinder fuel injectors are maintained deactivated.

In certain cases, the air's compression heating can be used in the prescribed sort of engine to warm the air before starting to reduce starting torque and promote complete first combustion (after being stopped).

Further, an actuator coupled to the spinning engine via an FEAD is spun so that it provides the function that triggered the restart. For example, where the engine restart is triggered by an operator request for vehicle cabin cooling, while spinning the engine unfueled, an AC compressor may be driven by the FEAD coupled to the engine so as to flow refrigerant through a heating, ventilation, and air conditioning (HVAC) circuit of the vehicle so as to lower a temperature of air directed into a vehicle cabin. As another example, the engine restart with combustion is triggered by a drop in transmission hydraulic actuation pressure. In a further example, if the unfueled engine restart is triggered to operate both the AC compressor and the transmission hydraulic pump, the power requirement from the FEAD drive during the unfueled engine spinning may be higher. The controller may address this higher power requirement by spinning the engine via the motor at a higher engine speed.

At 324, the method includes, while spinning the engine unfueled via the motor, holding the blowdown exhaust valve of each cylinder closed so as to limit the amount of air that is pumped through to the exhaust passage. As a result, exhaust catalyst cooling and oxygen saturation is minimized. As an example, holding the exhaust valve closed includes retarding blowdown valve timing so as to create negative valve overlap between the intake valve and the blowdown valve of each cylinder. As another example, holding the exhaust valve closed includes reducing valve lift. As non-limiting examples, the blow down valve may be closed by rocker collapse, duration control, lift control, or by phasing it radically to the point where it is only open when the cylinder pressure is lower than the exhaust pressure.

Turning now to FIGS. 4A and 4B, graph 400 (FIG. 4A) compares example valve timings that may be applied to engine cylinders during an engine restart where the engine is spun, fueled, to example valve timings that may be applied to engine cylinders during an engine restart where the engine is spun, unfueled, via a motor (graph 450, FIG. 4B). The example valve timings are depicted with respect to a piston position, for an engine cylinder comprising 4 valves: two intake valves and two exhaust valves, such as described above with reference to FIGS. 1-2. The example of FIGS. 4A-4B are drawn substantially to scale, even though each and every point is not labeled with numerical values. As such, relative differences in timings can be estimated by the drawing dimensions. However, other relative timings may be used, if desired.

Continuing with FIGS. 4A-4B, the cylinder is configured to receive intake via two intake valves and exhaust a first blowdown portion to a turbine inlet via a first exhaust valve (e.g., such as first, or blowdown, exhaust valves 8 shown in FIG. 1), exhaust a second scavenging portion to an intake passage via a second exhaust valve (e.g., such as second, or scavenge, exhaust valves 6 shown in FIG. 1) and non-combusted blowthrough air to the intake passage via the second exhaust valve. By adjusting the timing of the opening and/or closing of the second exhaust valve with that of the two intake valves, residual exhaust gases in the cylinder clearance volume may be cleaned out and recirculated as EGR along with fresh intake blowthrough air.

Graphs 400 and 450 illustrate an engine position along the x-axis in crank angle degrees (CAD). Curve 402 depicts piston positions (along the y-axis), with reference to their location from top dead center (TDC) and/or bottom dead center (BDC), and further with reference to their location within the four strokes (intake, compression, power and exhaust) of an engine cycle.

During engine operation, each cylinder typically undergoes a four stroke cycle including an intake stroke, compression stroke, expansion stroke, and exhaust stroke. During the intake stroke, generally, the exhaust valves close and intake valves open. Air is introduced into the cylinder via the corresponding intake passage, and the cylinder piston moves to the bottom of the cylinder so as to increase the volume within the cylinder. The position at which the piston is near the bottom of the cylinder and at the end of its stroke (e.g. when the combustion chamber is at its largest volume) is typically referred to by those of skill in the art as bottom dead center (BDC). During the compression stroke, the intake valves and exhaust valves are closed. The piston moves toward the cylinder head so as to compress the air within combustion chamber. The point at which the piston is at the end of its stroke and closest to the cylinder head (e.g. when the combustion chamber is at its smallest volume) is typically referred to by those of skill in the art as top dead center (TDC). In a process herein referred to as injection, fuel is introduced into the combustion chamber. In a process herein referred to as ignition, the injected fuel is ignited by known ignition means, such as a spark plug, resulting in combustion. During the expansion stroke, the expanding gases push the piston back to BDC. A crankshaft converts this piston movement into a rotational torque of the rotary shaft. During the exhaust stroke, in a traditional design, exhaust valves are opened to release the residual combusted air-fuel mixture to the corresponding exhaust passages and the piston returns to TDC. In this description, the second exhaust (scavenge) valves may be opened after the beginning of the exhaust stroke and stay open until after the end of the exhaust stroke while the first exhaust (blowdown) valves are closed and the intake valves are opened to flush out residual exhaust gases with blowthrough air.

Curves 404 (FIG. 4A) and 414 (FIG. 4B) depict a first intake valve timing, lift, and duration for a first intake valve (Int_1) while curves 406 (FIG. 4A) and 416 (FIG. 4B) depict a second intake valve timing, lift, and duration for a second intake valve (Int_2) coupled to the intake passage of the engine cylinder. Curves 408 (FIG. 4A) and 418 (FIG. 4B) depict an example exhaust valve timing, lift, and duration for a first exhaust valve (Exh_1, which may correspond to first, or blowdown, exhaust valves 8 shown in FIG. 1) coupled to a first exhaust manifold (e.g., blowdown exhaust manifold 84 shown in FIG. 1) of the engine cylinder, while curves 410 (FIG. 4A) and 420 (FIG. 4B) depict an example exhaust valve timing, lift, and duration for a second exhaust valve (Exh_2, which may correspond to second, or scavenge, exhaust valves 6 shown in FIG. 1) coupled to a second exhaust manifold (e.g., scavenge manifold 80 shown in FIG. 1) of the engine cylinder. As previously elaborated, the first exhaust manifold connects a first exhaust valve to the inlet of a turbine in a turbocharger and the second exhaust manifold connects a second exhaust valve to an intake passage via an EGR passage. The first and second exhaust manifolds may be separate from each other, as explained above.

In the depicted example of FIG. 4A, the first and second intake valves are fully opened from a closed position at a common timing (curves 404 and 406), starting close to intake stroke TDC, just after CAD2 (e.g., at or just after intake stroke TDC) and are closed after a subsequent compression stroke has commenced past CAD3 (e.g., after BDC). Additionally, when opened fully, the two intake valves may be opened with the same amount of valve lift L1 for the same duration of D1. In other examples, the two valves may be operated with a different timing by adjusting the phasing, lift or duration based on engine conditions.

Now turning to the exhaust valves, as shown in FIG. 4A, during an engine restart where the engine is cranked to a cranking speed by a starter motor and then cylinder fueling is resumed, the timing of the first exhaust valve and the second exhaust valve is staggered relative to one another. Herein, the first exhaust valve is the blowdown valve (BDV) and the second exhaust valve is the scavenge valve (SV). Specifically, the first exhaust valve is opened from a closed position at a first timing (curve 408) that is earlier in the engine cycle than the timing (curve 410) at which the second exhaust valve is opened from close. Specifically, the first timing for opening the first exhaust valve is between TDC and BDC of the power stroke, before CAD1 (e.g., before exhaust stroke BDC) while the timing for opening the second exhaust valve just after exhaust stroke BDC, after CAD1 but before CAD2. The first (curve 408) exhaust valve is closed before the end of the exhaust stroke and the second (curve 410) exhaust valve is closed after the end of the exhaust stroke. Thus, the second exhaust valve remains open to overlap slightly with opening of the intake valves.

In comparison, during an engine restart where the engine is spun, unfueled, via a motor so as to drive an actuator via an FEAD, the first exhaust valve is deactivated such that it does not open (as indicated by the absence of a curve at 418). Further, the timing of both the intake valves may be advanced (relative to their timing in FIG. 4A) while the timing of the first exhaust valve may be retarded (relative to the timing in FIG. 4A), so as to increase positive valve overlap between the intake valves and the scavenging valve. This increases recirculation of air pumped through the cylinders during an engine restart where the engine is spun unfueled by the motor. In the depicted example, the scavenge valve is opened (at 420) to reduce a high compression torque on the exhaust stroke. In other examples, however, the scavenge valve may also be held closed. Further still, the scavenge valve opening may be adjusted based on the availability of control flexibility on phasing, lift, and duration of valve operation.

In the example depicted at map 400 of FIG. 4A, the first exhaust valve may be fully opened from close before the start of an exhaust stroke (e.g., between 90 and 40 degrees before BDC), maintained fully open through a first part of the exhaust stroke and may be fully closed before the exhaust stroke ends (e.g., between 50 and 0 degrees before TDC) to collect the blowdown portion of the exhaust pulse. The second exhaust valve (curve 410) may be fully opened from a closed position just after the beginning of the exhaust stroke (e.g., between 40 and 90 degrees past BDC), maintained open through a second portion of the exhaust stroke and may be fully closed after the intake stroke begins (e.g., between 20 and 70 degrees after TDC) to exhaust the scavenging portion of the exhaust. Additionally, the second exhaust valve and the intake valves, as shown in FIG. 4A, may have a positive overlap phase (e.g., from between 20 degrees before TDC and 40 degrees after TDC until between 40 and 90 degrees past TDC) to allow blowthrough with EGR.

Additionally, the first exhaust valve may be opened at a first timing with a first amount of valve lift L2 while the second exhaust valve may be opened with a second amount of valve lift L3 (curve 310), where L3 is smaller than L2. Further still, the first exhaust valve may be opened at the first timing for a duration D2 while the second exhaust valve may be opened for a duration D3, where D3 is smaller than D2. It will be appreciated that in alternate embodiments, the two exhaust valves may have the same amount of valve lift and/or same duration of opening while opening at differently phased timings.

In comparison, in the example depicted at map 450 of FIG. 4B, wherein the engine is spinning unfueled, the blow down valve is deactivated while the scavenge valve is held open for the majority of the exhaust stroke. For example, the controller may open the scavenge valve shortly before the exhaust stroke to lower the cylinder pressure before the piston has to use engine power to push out the exhaust gasses, at least more than otherwise required. The intake valve position may be adjusted to provide Late Intake Valve Closing (LIVC) to minimize compression torque. However, LIVC may be used as a compromise due to limited flexibility in valve control. In embodiments having more flexibility in valve control, other intake valve timings and positions may be applied while the engine is spinning unfueled via the motor.

In this way, by deactivating the exhaust valve responsive for diverting blowdown air or exhaust from cylinders to an exhaust passage, air pumped through a spinning engine during an engine restart can be diverted to an engine intake, instead of to an exhaust passage. As a result, catalyst cooling and oxygen saturation due to spinning of an engine, unfueled by a motor, is reduced. Further, fuel economy may be improved because blowthrough air is not routed to the catalyst, being directed to a compressor inlet instead, and therefore, excess fuel may not need to be injected into the exhaust to maintain catalyst temperature and activation state.

Turning now to FIG. 5, an example engine restart from idle-stop operation is shown. The engine is coupled in a hybrid electric vehicle. Map 500 depicts engine speed at plot 502, engine fueling at plot 504, electric motor operation at plot 506, AC compressor operation at plot 508, blowdown exhaust valve operation at plot 510, and catalyst temperature at plot 512. All plots are shown over time along the x-axis.

Prior to t1, the engine is running fueled. The engine speed is varied to meet the torque demand of the vehicle operator, to propel the vehicle, and to provide torque to drive the AC compressor based on a cabin cooling demand. At this time, the engine cylinders are operated with the blowdown exhaust valve open so that at least a portion of exhaust gas can be delivered from the cylinder to the exhaust passage, for example, to drive an exhaust turbine. Due to flow of exhaust through the blowdown valve into an exhaust manifold, the exhaust catalyst temperature remains above a threshold 516.

Between t1 and t2, due to a drop in engine load, vehicle speed (not shown) and cabin cooling demand, the engine starts to operate at an idling speed. At t2, idle-stop conditions are considered met and engine fueling is disabled to bring the engine to an idle-stop. As a result of disabling fuel, the engine spins down to rest. Also at t2, the blowdown valve is closed. The blowdown valve is only opened when the engine is spinning fueled. When the engine is stopped, the blown down valve position may not have a functional effect, but closed is the desired position. As a result, exhaust flow to exhaust manifold reduces and the catalyst starts to cool over the duration of the idle-stop.

At t3, a cabin cooling request is received which requires AC compressor operation. Since the AC compressor is coupled to a FEAD and since engine combustion torque is not necessary for AC compressor operation, at t3, the engine is restarted but not fueled. In particular, the electric motor of the vehicle is operated at a power level P1 for a duration D1 to spin the engine unfueled at a speed that drives the FEAD which in turn drives the AC compressor to provide the desired cabin cooling. The electric motor may be a start motor/generator or an electric drive motor of the hybrid electric vehicle. As such, if the engine were restarted fueled, as shown by dashed line 505, instead of spinning the engine via the motor, the vehicle would have incurred a fuel penalty, potentially overturning the fuel economy benefit of the preceding idle-stop.

While the engine is spun unfueled via the electric motor, the blowdown valve of each engine cylinder is maintained closed while a scavenge exhaust valve of each cylinder is opened so that air pumped through the engine cylinders by the rotating engine is not directed to the exhaust catalyst but is recirculated to the engine intake instead. As a result, the catalyst temperature remains above threshold 516. If the blowdown exhaust valve were opened during the unfueled engine restart operation, then the catalyst temperature would have dropped below threshold 516 shortly after t3, as indicated by dashed line 514. As such, the drop in catalyst temperature would have triggered a fueled engine restart operation, which would also adversely impact the fuel economy of the vehicle.

At t4, the cabin cooling demand drops, and AC compressor operation is not required anymore. Therefore at t4, AC compressor operation is disabled. Also, the electric motor operation is disabled, causing the engine to spin to rest, and the FEAD to stop driving the AC compressor. The engine returns to an idle-stop condition and the catalyst continues to cool over the idle-stop.

At t5, the catalyst temperature falls below threshold 516 triggering a fueled engine restart. In particular, an engine restart with combustion torque being generated is required to generate exhaust heat for heating the exhaust catalyst. Between t5 and t6, the engine is spun unfueled via the electric motor up to a cranking speed. In particular, the electric motor of the vehicle is operated at a power level P2 that is lower than power level P1, and spun for a duration D2, smaller than duration D1 to spin the engine unfueled to a cranking speed. At t6, once the engine reaches the cranking speed, engine fueling is resumed and the engine speed is maintained thereafter via air fuel combustion in engine cylinders. After t6, the engine combustion torque generates exhaust heat that raises the catalyst temperature above threshold 516. In addition, the combustion torque drives the vehicle, meets the operator torque demand, and drives the FEAD which in turn drives the AC compressor to provide a desired level of cabin cooling.

In this way, a start-stop engine may be operated unfueled, and rotated via an electric motor, during restarts where combustion torque is not necessary to drive an actuator, such as to drive an AC compressor or an automatic transmission pump. The technical effect of spinning an engine electrically is that idle-stop conditions can be extended, allowing the fuel economy benefits of an idle-stop to be improved. The technical effect of holding a blowdown exhaust valve closed while the engine is rotated electrically via an electric motor is that air is prevented from being pumped into an exhaust catalyst, reducing the need for excess fuel to regenerate the catalyst. Overall, a fuel economy of the engine is significantly improved and a frequency of engine restarts from idle-stop are reduced.

A first example of a vehicle method comprises: responsive to selected engine restart conditions, spinning an engine, unfueled, via an electric motor at a speed that drives an actuator via a front end accessory drive coupled to the engine. In the preceding example, additionally or optionally, the method further comprises, responsive to all other engine restart conditions, spinning the engine fueled. In any or all of the preceding examples, additionally or optionally, the method further comprises, while spinning the engine unfueled, disabling blowdown of air from engine cylinders to an exhaust catalyst. In any or all of the preceding examples, additionally or optionally, the disabling includes opening a first, scavenging exhaust valve of each engine cylinder while closing a second, blowdown exhaust valve of each cylinder to recirculate the blowdown air from upstream of the exhaust catalyst to an engine intake. In any or all of the preceding examples, additionally or optionally, opening the first exhaust valve while closing the second exhaust valve includes operating the first exhaust valve during an exhaust stroke of a corresponding cylinder, the first exhaust valve operated with a lift and a timing that generates positive valve overlap with intake valves of the corresponding cylinder, while operating the second exhaust valve with no lift. In any or all of the preceding examples, additionally or optionally, the actuator is one of an automatic transmission oil pump and a compressor of an air conditioning system. In any or all of the preceding examples, additionally or optionally, the selected engine restart conditions do not require engine combustion torque for engine component heating or vehicle propulsion. In any or all of the preceding examples, additionally or optionally, the vehicle is a hybrid electric vehicle, and wherein the electric motor is one of a starter motor and an electric drive motor. In any or all of the preceding examples, additionally or optionally, spinning the engine, unfueled, via the electric motor to drive the actuator includes spinning the engine at higher than an engine cranking speed, and operating the electric motor at a higher output and for a longer duration relative to engine cranking. In any or all of the preceding examples, additionally or optionally, the engine is spun unfueled via the motor from a state of engine rest.

Another example method for an engine of a vehicle comprises: spinning an engine unfueled via an electric motor to a first speed to crank the engine; and spinning the engine unfueled via the electric motor to a second, different speed to drive an actuator via a front end accessory drive coupled to the engine. In any or all of the preceding examples, additionally or optionally, the first speed is lower than the second speed, and wherein the engine is spun unfueled via the electric motor from a state of engine rest. In any or all of the preceding examples, additionally or optionally, spinning the engine unfueled to the first speed includes operating the electric motor for a shorter duration and at a lower output as compared to the spinning the engine unfueled to the second speed. In any or all of the preceding examples, additionally or optionally, the method further comprises, while spinning the engine unfueled to the first speed, holding a first exhaust valve and a second exhaust valve of each engine cylinder open, and while spinning the engine unfueled to the second speed, holding the first exhaust valve of each engine cylinder open while holding the second exhaust valve of each cylinder closed, the first exhaust valve coupling a corresponding cylinder to an engine intake via a recirculation passage, the second exhaust valve coupling the corresponding cylinder to an engine exhaust including an exhaust catalyst. In any or all of the preceding examples, additionally or optionally, the spinning the engine unfueled via the electric motor to the first speed is responsive to a first engine restart condition and wherein the spinning the engine unfueled via the electric motor to the second speed is responsive to a second, different engine restart condition, the first restart condition including one or more of a drop in system battery state of charge, a drop in engine exhaust catalyst temperature, and an increase in operator torque demand, the second restart condition including one or more of a demand for vehicle cabin cooling, and a drop in transmission temperature. In any or all of the preceding examples, additionally or optionally, the method further comprises, resuming engine fueling and disabling the electric motor after the engine speed reaches the first speed, and then raising the engine speed from the first speed to the second speed by spinning the engine fueled. In any or all of the preceding examples, additionally or optionally, the actuator is one of an automatic transmission oil pump and a compressor of an air conditioning system.

Another example vehicle system comprises: an engine including a plurality of engine cylinders; a front end accessory drive (FEAD) coupled to an output shaft of the engine; selectively deactivatable cylinder fuel injectors; a first set of cylinder exhaust valves coupled to an engine intake via a recirculation passage; a second set of cylinder exhaust valves coupled to an engine exhaust including an exhaust catalyst; an electric motor powered by a battery; a transmission oil pump coupled to the FEAD; a heating ventilation and air conditioning (HVAC) system including a compressor coupled to the FEAD; and a controller including computer readable instructions stored in memory that when executed cause the controller to: disable engine fueling and spin the engine to rest responsive to idle-stop conditions; operate the engine in a first restart mode including spinning the engine, unfueled, via the motor from rest to a first speed, then resuming engine fueling, and spinning the engine, fueled, from the first speed; and operate the engine in a second restart mode including spinning the engine, unfueled, via the motor from rest to a second speed, higher than the first speed, without resuming engine fueling. In any or all of the preceding examples, additionally or optionally, the controller includes further instructions that cause to the controller to hold each of the first and second set of cylinder exhaust valves open while operating the engine in the first restart mode; and hold the first set of cylinder exhaust valves open and the second set of cylinder exhaust valves closed while operating the engine in the second restart mode. In any or all of the preceding examples, additionally or optionally, the controller includes further instructions that cause to the controller to operate the engine in the first mode responsive to one or more of a drop in state of charge of the battery below a threshold charge, a drop in exhaust catalyst temperature below a first threshold temperature, a drop in engine temperature below a second threshold temperature, an increase in operator torque demand received via a pedal, and an operator request to launch the vehicle system; and operate the engine in the second mode responsive to one or more of an operator request for vehicle cabin cooling, and a drop in transmission pressure below a threshold.

In a further representation, the vehicle is a hybrid electric vehicle or an autonomous vehicle.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle method comprising:
responsive to selected engine restart conditions, spinning an engine, unfueled, via an electric motor to drive an actuator via a front end accessory drive coupled to the engine; and
while spinning the engine unfueled to a first speed, holding a second exhaust valve and a first exhaust valve of each engine cylinder open, and while spinning the engine unfueled to a second speed, holding the second exhaust valve of each engine cylinder open while holding the first exhaust valve of each cylinder closed, the second exhaust valve coupling a corresponding cylinder to an engine intake via a recirculation passage, the first exhaust valve coupling the corresponding cylinder to an engine exhaust including an exhaust catalyst.

2. The method of claim 1, further comprising, responsive to all other engine restart conditions, spinning the engine fueled.

3. The method of claim 1, further comprising, while spinning the engine unfueled, disabling blowdown of air from engine cylinders to an exhaust catalyst by adjusting a valve actuator.

4. The method of claim 3, wherein the disabling includes opening the second exhaust valve of each engine cylinder while closing the first, exhaust valve of each cylinder to recirculate the blowdown air from upstream of the exhaust catalyst to an engine intake.

5. The method of claim 4, wherein opening the first second exhaust valve while closing the first exhaust valve includes operating the second exhaust valve during an exhaust stroke of a corresponding cylinder, the second exhaust valve operated with a lift and a timing that generates positive valve overlap with intake valves of the corresponding cylinder, while operating the second first exhaust valve with no lift.

6. The method of claim 1, wherein the actuator is one of an automatic transmission oil pump and a compressor of an air conditioning system.

7. The method of claim 2, wherein the selected engine restart conditions include one or more of a request for vehicle cabin cooling, and transmission hydraulic pressure relative to a threshold, and wherein the all other engine restart conditions include one or more of a request for engine component heating and vehicle propulsion.

8. The method of claim 1, wherein the vehicle is a hybrid electric vehicle, and wherein the electric motor is one of a starter motor and an electric drive motor.

9. The method of claim 1, wherein spinning the engine, unfueled, via the electric motor to drive the actuator includes spinning the engine at higher than an engine cranking speed, and operating the electric motor at a higher output and for a longer duration relative to engine cranking.

10. The method of claim 1, wherein the engine is spun unfueled via the motor from a state of engine rest.

11. A method for an engine of a vehicle, comprising:
spinning an engine unfueled via an electric motor to a first speed to crank the engine to a cranking speed before resuming engine fueling;
spinning the engine unfueled via the electric motor to a second, different speed to drive an actuator via a front end accessory drive coupled to the engine with engine fueling maintained disabled; and
while spinning the engine unfueled to the first speed, holding a second exhaust valve and a first exhaust valve of each engine cylinder open, and while spinning the engine unfueled to the second speed, holding the second exhaust valve of each engine cylinder open while holding the first exhaust valve of each cylinder closed, the second exhaust valve coupling a corresponding cylinder to an engine intake via a recirculation passage, the first exhaust valve coupling the corresponding cylinder to an engine exhaust including an exhaust catalyst.

12. The method of claim 11, wherein the first speed is lower than the second speed, and wherein the engine is spun unfueled via the electric motor from a state of engine rest.

13. The method of claim 11, wherein spinning the engine unfueled to the first speed includes operating the electric motor for a shorter duration and at a lower output as compared to the spinning the engine unfueled to the second speed.

14. The method of claim 11, where the actuator is an air conditioner compressor.

15. The method of claim 11, wherein the spinning the engine unfueled via the electric motor to the first speed is responsive to a first engine restart condition and wherein the spinning the engine unfueled via the electric motor to the second speed is responsive to a second, different engine restart condition, the first restart condition including one or more of a drop in system battery state of charge, a drop in engine exhaust catalyst temperature, an increase in operator torque demand, and an increase in vehicle speed, the second restart condition including one or more of a rise in vehicle cabin temperature relative to a setpoint, and transmission pressure lower than a threshold.

16. The method of claim 11, further comprising, resuming engine fueling and disabling the electric motor after the engine speed reaches the first speed, and then raising the engine speed from the first speed to the second speed by spinning the engine fueled.

17. The method of claim 11, wherein the actuator is one or both of an automatic transmission oil pump and a compressor of an air conditioning system.

* * * * *